(12) United States Patent
Legatt et al.

(10) Patent No.: US 10,500,801 B2
(45) Date of Patent: Dec. 10, 2019

(54) POLYMERIC NETTING OF STRANDS AND FIRST AND SECOND RIBBONS AND METHODS OF MAKING THE SAME

(71) Applicant: 3M INNOVATIVE PROPERTIES COMPANY, St. Paul, MN (US)

(72) Inventors: Michelle L. Legatt, St. Paul, MN (US); Ronald W. Ausen, St. Paul, MN (US); William J. Kopecky, Hudson, WI (US); Wei Zhang, Woodbury, MN (US); Lori-Ann S. Prioleau, St. Paul, MN (US); Delony L. Langer-Anderson, Hugo, MN (US); Leigh E. Wood, Woodbury, MN (US); Thomas B. Galush, Roseville, MN (US)

(73) Assignee: 3M Innovative Properties Company, st. Paul, MN (US)

( * ) Notice: Subject to any disclaimer, the term of this patent is extended or adjusted under 35 U.S.C. 154(b) by 437 days.

(21) Appl. No.: 15/122,006

(22) PCT Filed: Feb. 26, 2015

(86) PCT No.: PCT/US2015/017771
§ 371 (c)(1),
(2) Date: Aug. 26, 2016

(87) PCT Pub. No.: WO2015/130942
PCT Pub. Date: Sep. 3, 2015

(65) Prior Publication Data
US 2017/0008242 A1     Jan. 12, 2017

Related U.S. Application Data

(60) Provisional application No. 61/946,592, filed on Feb. 28, 2014, provisional application No. 61/946,601, filed on Feb. 28, 2014.

(51) Int. Cl.
*B29D 28/00*     (2006.01)
*B29C 48/30*     (2019.01)
(Continued)

(52) U.S. Cl.
CPC .............. *B29D 28/00* (2013.01); *B29C 48/30* (2019.02); *B29C 48/305* (2019.02);
(Continued)

(58) Field of Classification Search
CPC ...... B29D 28/00; B29L 2028/00; B32B 5/028
(Continued)

(56) References Cited

U.S. PATENT DOCUMENTS 2,920,354 A    1/1960   Zumbrunnen
3,012,275 A    12/1961  Nalle, Jr.
(Continued)

FOREIGN PATENT DOCUMENTS

CA      1058986       7/1979
CN      201879910     6/2011
(Continued)

OTHER PUBLICATIONS

International Search Report for PCT International Application No. PCT/US2015/027772, dated May 29, 2015, 4pgs.

*Primary Examiner* — Elizabeth C Imani

(57) ABSTRACT

A polymeric netting includes polymeric strands and first and second polymeric ribbons. The first and second ribbons each independently have a height-to-width aspect ratio of at least three to one and a major surface that is intermittently bonded to a polymeric strand, with first and second edges symmetrically disposed on opposite sides of a center line bisecting the major surface. The netting has first and second opposing major surfaces transverse to the major surfaces of the first and second ribbons. The first major surface of the netting includes the first edges of the first ribbons, and the second
(Continued)

major surface includes the second edges of the second ribbons. The first ribbons do not extend to the second major surface, and the second ribbons do not extend to the first major surface. Articles including the netting, an extrusion die, and a method useful for making the netting are also disclosed.

19 Claims, 17 Drawing Sheets

(51) Int. Cl.
    *B29C 48/305*     (2019.01)
    *B29K 105/00*     (2006.01)
    *B29L 28/00*     (2006.01)

(52) U.S. Cl.
    CPC ............... *B29K 2105/0032* (2013.01); *B29K 2995/0046* (2013.01); *B29L 2028/00* (2013.01)

(58) Field of Classification Search
    USPC ........................................... 428/119; 442/50
    See application file for complete search history.

(56) References Cited

U.S. PATENT DOCUMENTS

| | | |
|---|---|---|
| 3,019,147 A | 1/1962 | Nalle, Jr. |
| 3,178,328 A | 4/1965 | Tittmann |
| 3,252,181 A | 5/1966 | Hureau |
| 3,505,157 A | 4/1970 | Fields |
| 3,697,347 A | 10/1972 | Lehmann |
| T909,008 I4 | 4/1973 | Fruehauf |
| 3,831,741 A | 8/1974 | Poupitch |
| 3,917,889 A | 11/1975 | Gaffney |
| 3,932,092 A | 1/1976 | Hureau |
| 3,950,584 A | 4/1976 | Bramley |
| 4,038,008 A | 7/1977 | Larsen |
| 4,088,805 A | 5/1978 | Wiegand |
| 4,152,479 A | 5/1979 | Larsen |
| 4,384,022 A | 5/1983 | Fowler |
| 4,629,643 A | 12/1986 | Curro |
| 4,634,485 A | 1/1987 | Welygan |
| 4,636,419 A | 1/1987 | Madsen |
| 4,656,075 A | 4/1987 | Mudge |
| 4,661,389 A | 4/1987 | Mudge |
| 4,662,946 A | 5/1987 | Mercer |
| 4,710,185 A | 12/1987 | Sneyd |
| 4,732,723 A | 3/1988 | Madsen |
| 4,879,084 A | 11/1989 | Parnigoni |
| 4,933,081 A | 6/1990 | Sasaki |
| 5,135,521 A | 8/1992 | Luceri |
| 5,236,241 A | 8/1993 | Courrège |
| 5,366,782 A | 11/1994 | Curro |
| 5,419,695 A | 5/1995 | Clegg |
| 5,451,239 A | 9/1995 | Sewell |
| 5,534,339 A | 7/1996 | Stokes |
| 5,593,628 A | 1/1997 | Scholz |
| 5,660,778 A | 8/1997 | Ketcham |
| 5,679,379 A | 10/1997 | Fabbricante |
| 5,811,186 A | 9/1998 | Martin |
| 5,817,704 A | 10/1998 | Shiveley |
| 5,851,089 A | 12/1998 | Beretta |
| 5,891,549 A | 4/1999 | Beretta |
| 6,056,809 A | 5/2000 | Chapman |
| 6,090,234 A | 7/2000 | Barone |
| 6,093,663 A | 7/2000 | Ouellette |
| 6,146,745 A | 11/2000 | Altonen |
| 6,168,849 B1 | 1/2001 | Braverman |
| 6,280,676 B1 | 8/2001 | Cederblad |
| 6,391,420 B1 | 5/2002 | Cederblad |
| 6,461,339 B1 | 10/2002 | Sugahara |
| 6,673,418 B1 | 1/2004 | DeOlivera |
| 6,692,606 B1 | 2/2004 | Cederblad |
| 6,706,649 B2 | 3/2004 | Schwinn |
| 6,740,792 B2 | 5/2004 | Waldroup |
| 7,048,469 B1 | 5/2006 | Jansson |
| 7,241,483 B2 | 7/2007 | Ausen |
| 7,329,621 B2 | 2/2008 | Collier, IV |
| 7,351,217 B2 | 4/2008 | Scherpenborg |
| 7,757,334 B2 | 7/2010 | Patel |
| 7,897,078 B2 | 3/2011 | Petersen |
| 8,758,882 B2 | 6/2014 | Ausen |
| 8,889,243 B2 | 11/2014 | Hanschen |
| 9,012,013 B2 | 4/2015 | Duffy |
| 9,138,031 B2 | 9/2015 | Wood |
| 9,327,429 B2 | 5/2016 | Ausen |
| 9,724,865 B2 | 8/2017 | Ausen |
| 2001/0008690 A1 | 7/2001 | Okamoto |
| 2002/0112325 A1 | 8/2002 | Keohan |
| 2003/0181882 A1 | 9/2003 | Toyoshima |
| 2004/0154763 A1 | 8/2004 | Polat |
| 2004/0170801 A1 | 9/2004 | Seth |
| 2004/0241333 A1 | 12/2004 | Cielenski |
| 2006/0108082 A1 | 5/2006 | Bogdanski |
| 2007/0136967 A1 | 6/2007 | Tochacek |
| 2008/0090050 A1 | 4/2008 | Seyler |
| 2008/0269708 A1 | 10/2008 | Caracci |
| 2009/0144923 A1 | 6/2009 | Tuman |
| 2011/0085749 A1 | 4/2011 | Frei |
| 2011/0092123 A1 | 4/2011 | Gupta |
| 2011/0147475 A1 | 6/2011 | Biegler |
| 2011/0151171 A1 | 6/2011 | Biegler |
| 2012/0301637 A1 | 11/2012 | De Vries |
| 2013/0004723 A1 | 1/2013 | Ausen |
| 2013/0004729 A1 | 1/2013 | Ausen |
| 2013/0011600 A1 | 1/2013 | Ausen |
| 2013/0105060 A1 | 5/2013 | Shay |
| 2014/0220328 A1 | 8/2014 | Ausen |
| 2015/0238783 A1 | 8/2015 | Nguyen |
| 2016/0002838 A1 | 1/2016 | Ausen |
| 2016/0074552 A1 | 3/2016 | Liu |
| 2016/0101590 A1 | 4/2016 | Kane et al. |
| 2016/0354898 A1 | 12/2016 | Nienaber |
| 2016/0362824 A1 | 12/2016 | Ausen |
| 2017/0065923 A1 | 3/2017 | Fox |
| 2017/0066210 A1 | 3/2017 | Wood |
| 2017/0081573 A1 | 3/2017 | Kipke |
| 2017/0274228 A1 | 9/2017 | Nguyen |
| 2017/0361518 A1 | 12/2017 | Ausen |

FOREIGN PATENT DOCUMENTS

| | | |
|---|---|---|
| DE | 1109131 | 6/1961 |
| DE | 1779330 | 9/1971 |
| DE | 3909189 | 11/1989 |
| EP | 0097496 | 1/1984 |
| EP | 0191355 | 8/1986 |
| EP | 1137382 | 10/2001 |
| FR | 2159189 | 6/1973 |
| GB | 969655 | 9/1964 |
| GB | 1231456 | 5/1971 |
| GB | 2262906 | 7/1993 |
| JP | 61189927 | 8/1986 |
| WO | WO 2012-037065 | 3/2012 |
| WO | WO 2013-028654 | 2/2013 |
| WO | 2013-173035 | 11/2013 |

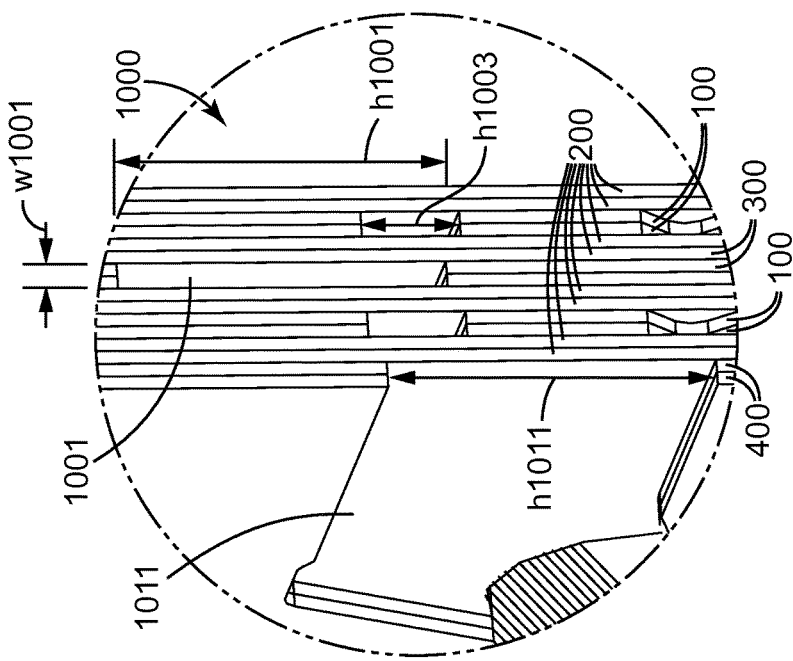
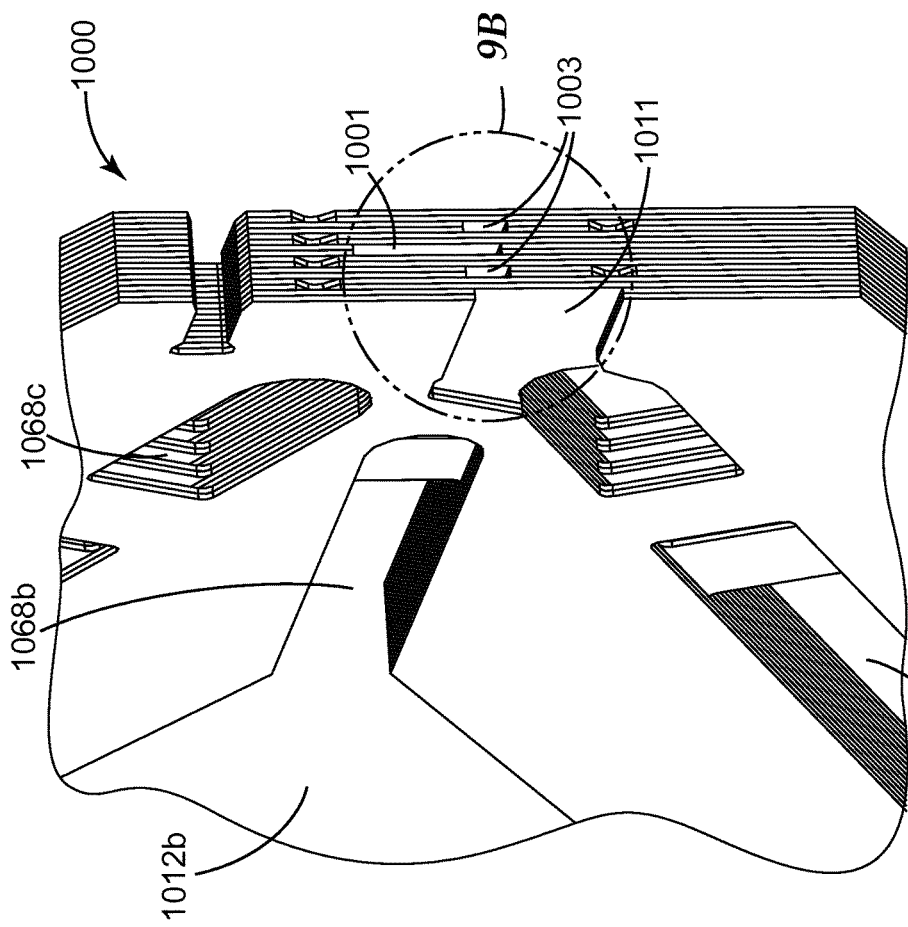
FIG. 9A
FIG. 9B

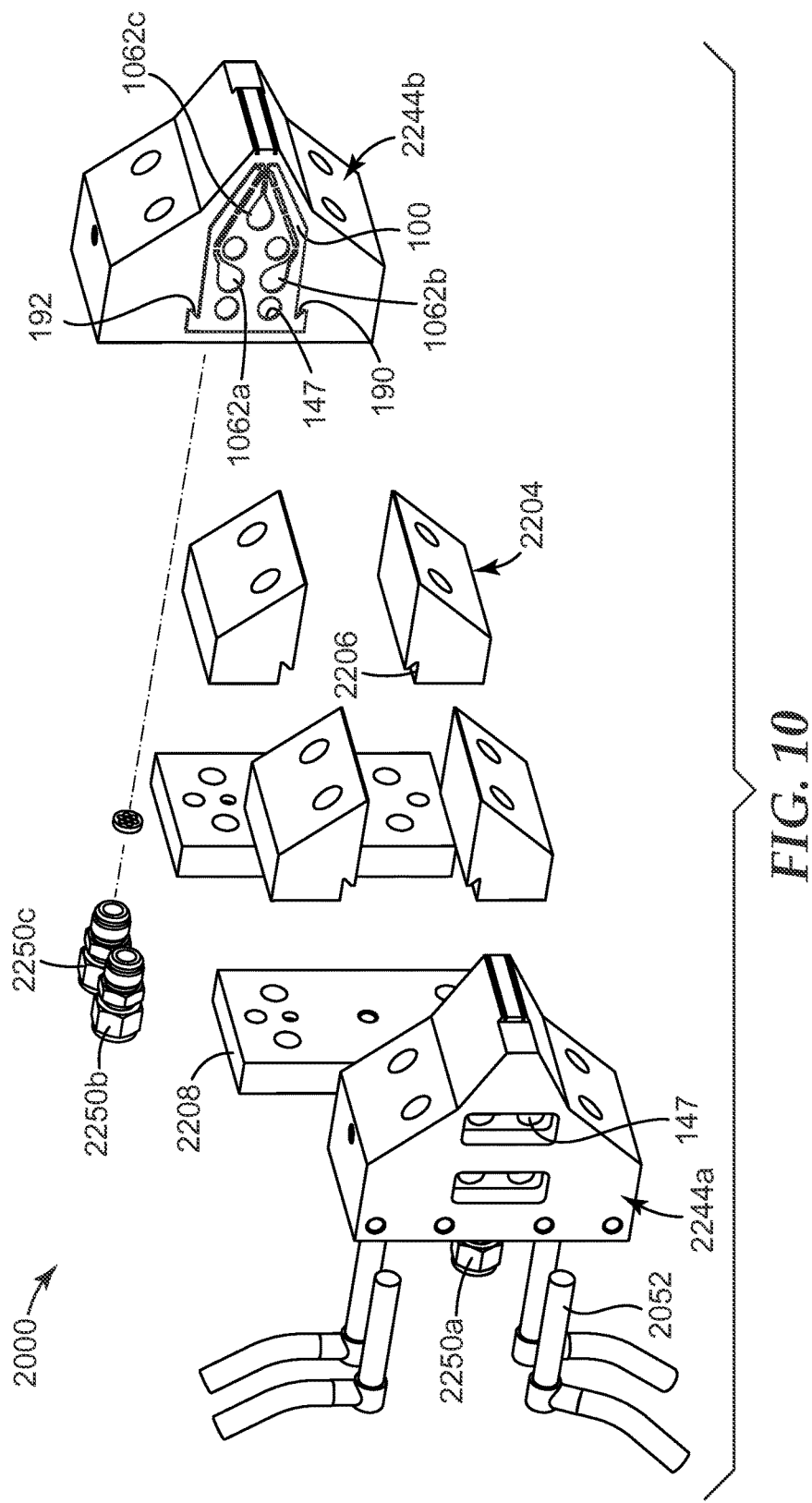

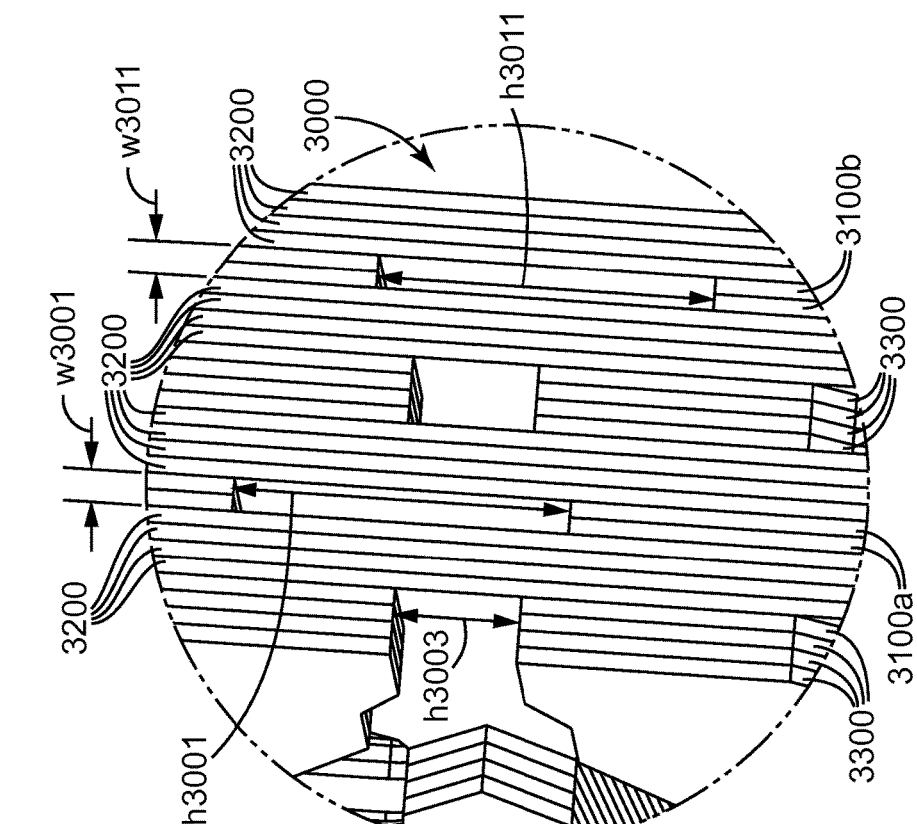
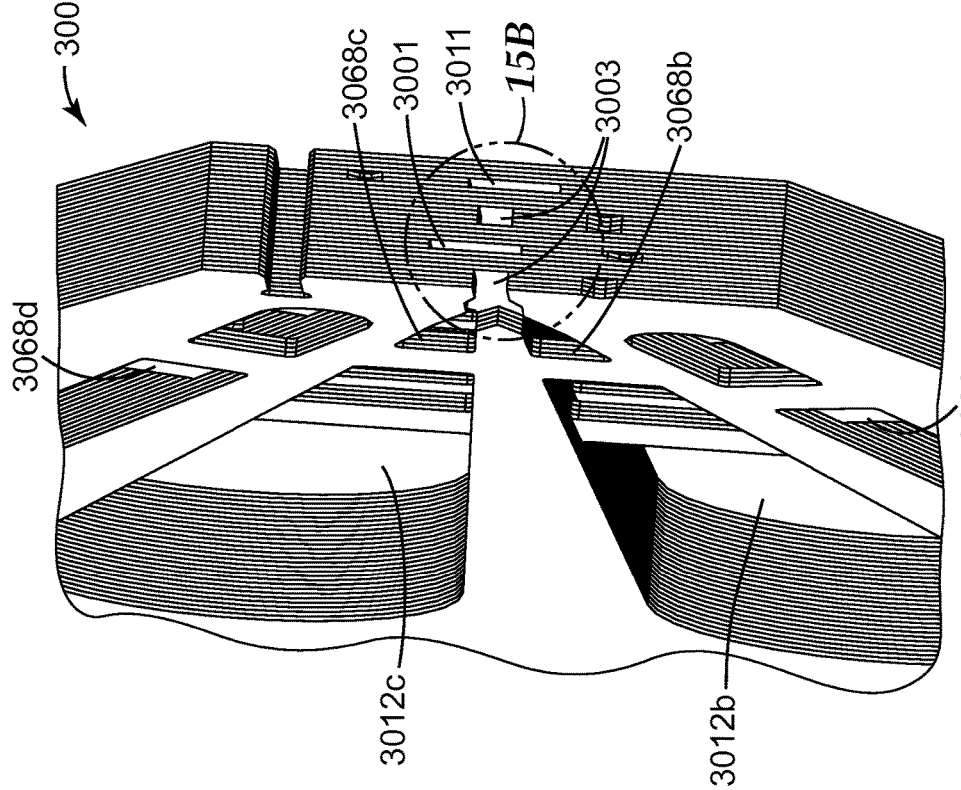
FIG. 15B
FIG. 15A

POLYMERIC NETTING OF STRANDS AND FIRST AND SECOND RIBBONS AND METHODS OF MAKING THE SAME

CROSS-REFERENCE TO RELATED APPLICATIONS

This application is a national stage filing under 35 U.S.C. 371 of PCT/US2015/017771, filed Feb. 26, 2015, which claims priority to U.S. Provisional Application Nos. 61/946601, filed Feb. 28, 2014, and 61/946592, filed Feb. 28, 2016, the disclosures of which are incorporated by reference in their entirety herein.

BACKGROUND

Polymeric nets are used for a wide variety of applications, including reinforcement of paper articles or inexpensive textiles (e.g., in sanitary paper articles, paper cloth, and heavy duty bags), non-woven upholstery fabrics, window curtains, decorative netting, wrapping material, mosquito netting, protective gardening netting against insects or birds, backing for growing of grass or plants, sport netting, light fishing netting, and filter materials.

Extrusion processes for making polymeric nets are known in the art. For example, recently extrusion dies and methods using a plurality of shims have been reported to be capable of producing polymeric netting having a thickness up to 750 micrometers. The polymeric strands of the netting are described as being periodically joined together at bond regions throughout the array. See Int. Pat. Appl. Pub. Nos. WO2013/028654, WO2013/032683, and WO2013/052371, each to Ausen et al. Also, an extruded article including an undulating strand with an aspect ratio of at least about 2 to 1 is disclosed in U.S. Pat. No. 4,634,485 (Welygan et al.).

SUMMARY

The present disclosure provides a polymeric netting including different types of generally continuous elements, two of which are ribbon like and oriented on their edges within the netting. The two different ribbon-like elements are offset from each other such that one provides the first major surface of the netting and the other provides the second major surface of the netting. The ribbon-like elements can be at least partially held in place by another element, which typically has a smaller height.

In one aspect, the present disclosure provides a polymeric netting including polymeric strands and first and second polymeric ribbons. Each of the polymeric strands and first and second polymeric ribbons has a length and width, the length being the longest dimension and the width being the shortest dimension. The first and second polymeric ribbons each independently have a height-to-width aspect ratio of at least three to one and a major surface that is intermittently bonded multiple times to a polymeric strand, with a center line bisecting the major surface and first and second edges symmetrically disposed on opposite sides of the center line. The polymeric netting has first and second opposing major surfaces transverse to the major surfaces of the first and second polymeric ribbons. The first major surface of the polymeric netting includes the first edges of the first polymeric ribbons, and the second major surface includes the second edges of the second polymeric ribbons. The first polymeric ribbons do not extend to the second major surface, and the second polymeric ribbons do not extend to the first major surface.

In another aspect, the present disclosure provides an absorbent article including the polymeric netting described above. In some embodiments, the absorbent article further includes a liquid impermeable backsheet and an absorbent core between the polymeric netting and the backsheet. In some embodiments, the absorbent article includes the polymeric netting between the absorbent core and the backsheet, and in some embodiments, the absorbent article includes the polymeric netting within the absorbent core.

In another aspect, the present disclosure provides the polymeric netting described above joined to a carrier.

In another aspect, the present disclosure provides the polymeric netting described above for use as an elastic wrap.

In embodiments of any of the foregoing aspects, typically each major surface of the polymeric ribbon is intermittently bonded multiple times to a polymeric strand.

In another aspect, the present disclosure provides an extrusion die. The extrusion die includes at least one cavity, a dispensing surface, and fluid passageways between the at least one cavity and the dispensing surface. The dispensing surface has an array of first and third dispensing orifices interspersed with an array of discrete, substantially vertically aligned second dispensing orifices. The first and second dispensing orifices each have a height and a width. The first and third dispensing orifices each independently have a height-to-width aspect ratio of at least three to one. The array of first dispensing orifices is vertically and horizontally offset from the array of third dispensing orifices. Typically, the heights of the first dispensing orifices and third dispensing orifices are larger than the height of the second dispensing orifices.

In another aspect, the present disclosure provides a method of making a polymeric netting, for example, as described above. The method includes providing the extrusion die described above. The method further includes simultaneously dispensing first polymeric ribbons from the first dispensing orifices at a first speed, polymeric strands from the second dispensing orifices at a second speed, and second polymeric ribbons from the third dispensing orifices at a third speed to provide the polymeric netting, wherein the second speed is at least twice the first speed and at least twice the third speed.

In this application, terms such as "a", "an" and "the" are not intended to refer to only a singular entity, but include the general class of which a specific example may be used for illustration. The terms "a", "an", and "the" are used interchangeably with the term "at least one". The phrases "at least one of" and "comprises at least one of" followed by a list refers to any one of the items in the list and any combination of two or more items in the list. All numerical ranges are inclusive of their endpoints and non-integral values between the endpoints unless otherwise stated (e.g. 1 to 5 includes 1, 1.5, 2, 2.75, 3, 3.80, 4, and 5).

The terms "first" and "second" are used in this disclosure. It will be understood that, unless otherwise noted, those terms are used in their relative sense only. In particular, in some embodiments certain components may be present in interchangeable and/or identical multiples (e.g., pairs). For these components, the designation of "first" and "second" may be applied to the components merely as a matter of convenience in the description of one or more of the embodiments. However, when first and second edges are described, it should be understood that the first edges for a portion of polymeric ribbons are each in the same orientation. For example, when looking at a polymeric netting, the first edges may be all those defining the upper surface of the polymeric netting, and the second edges may be all those defining the lower surface of the polymeric netting, or vice versa.

The term "ribbon" refers to longitudinally extending elements in the polymeric netting having a generally rectangular or oblong cross section. There may be ribbons in the polymeric nettings disclosed herein other than those having a height-to-width aspect ratio of at least three to one, at least five to one, or at least seven to one. In other words, not all elements in the polymeric netting having rectangular cross sections are required to have a height-to-width aspect ratio of at least three to one, at least five to one, or at least seven to one. The polymeric strands may also have rectangular cross sections.

A major surface of the polymeric ribbons is a surface defined by the height and the length of the ribbon.

The terms "multiple" and "a plurality" refer to more than one.

The term "netting" is used to describe the constructions herein since there are spaces between the ribbons and strands, for example, between the regions where they are bonded together. Such spaces provide openings in the netting.

The term "elastic" refers to any material (such as a film that is 0.002 mm to 0.5 mm thick) that exhibits recovery from stretching or deformation. In some embodiments, a material may be considered to be elastic if, upon application of a stretching force, it can be stretched to a length that is at least about 25 (in some embodiments, 50) percent greater than its initial length and can recover at least 40 percent of its elongation upon release of the stretching force. "Elongation" in terms of percent refers to {(the extended length-the initial length)/the initial length} multiplied by 100.

The above summary of the present disclosure is not intended to describe each disclosed embodiment or every implementation of the present disclosure. The description that follows more particularly exemplifies illustrative embodiments. It is to be understood, therefore, that the following description should not be read in a manner that would unduly limit the scope of this disclosure.

BRIEF DESCRIPTION OF THE DRAWINGS

The disclosure may be more completely understood in consideration of the following detailed description of various embodiments of the disclosure in connection with the accompanying drawings, in which:

FIG. 9A is a perspective assembly drawing of a sequence of shims employing the shims of FIGS. 5, 6, 7, and 8 configured to form a portion of the polymeric netting as shown in FIGS. 1 and 2;

FIG. 9B is an expanded view of the section referenced as "9B" in FIG. 9A;

FIG. 10 is an exploded perspective view of an example of a mount suitable for an extrusion die composed of multiple repeats of the sequence of shims shown in FIG. 9A;

FIG. 15A is a perspective drawing of a sequence of shims employing the shims of FIGS. 12 to 14 configured to form a portion of a polymeric netting as shown, for example, in FIG. 4;

FIG. 15B is an expanded view of the section referenced as "15B" in FIG. 15A;

DETAILED DESCRIPTION

Figure 1:
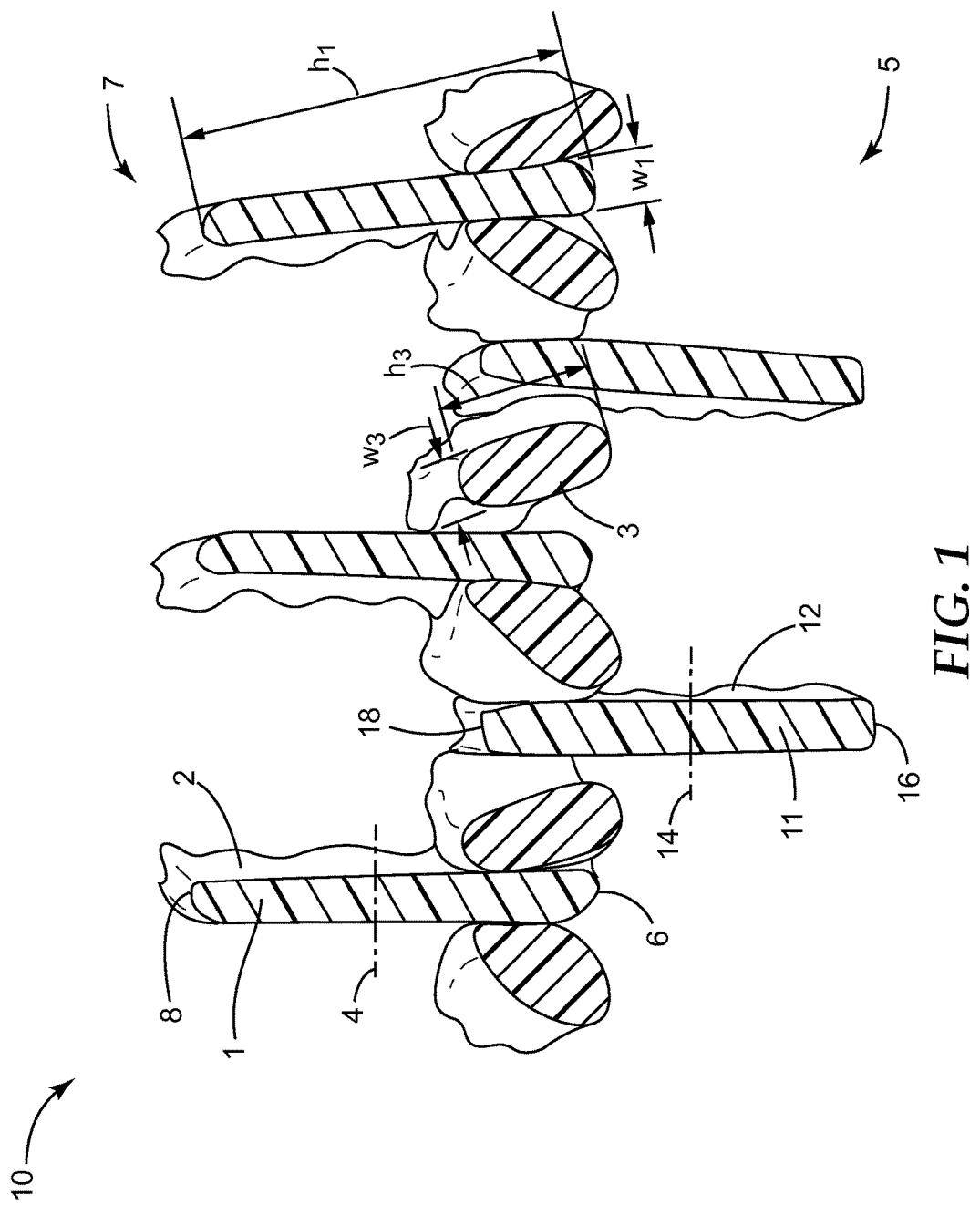
FIG. 1 is cross-sectional side view of an embodiment of a polymeric netting according to the present disclosure.

FIG. 1 illustrates a side view of an embodiment of a polymeric netting 10 according to the present disclosure. The polymeric netting 10 includes first polymeric ribbons 11, second polymeric ribbons 1, and polymeric strands 3. The polymeric ribbons 1, 11 and polymeric strands 3 each have a length, width "w1" and "w3", and height "h1" and "h3". The length of the polymeric ribbons 1, 11 and strands 3 is the longest dimension and is not shown in FIG. 1. The width is the shortest dimension. The height "h1" of the ribbons 1, 11 and the height "h3" strands 3 is typically between the length and width of each, respectively. However, the strands 3 can also have heights "h3" that are substantially the same as their widths "w3". For circular strands, the height and width may both be referred to as diameter. The height-to-width aspect ratio of at least one of the first polymeric ribbons 11 or second polymeric ribbons 1 (and typically both) is at least three to one. In some embodiments, the height-to-width aspect ratio of at least one of the first polymeric ribbons 11 or second polymeric ribbons 1 is at least 5:1, 7:1, 8:1, 10:1, 11:1, 15:1, 20:1, 30:1, or 40:1. The height of the first and second polymeric ribbons is generally greater than that of the polymeric strands. In some embodiments, the height of at least one of the first and second polymeric ribbons is at least 2, 2.5, 3, 5, 10, or 20 times greater than the height of the single polymeric strand. The height h1 of at least one of the first or second polymeric ribbons may be in a range from 50 micrometers to 3 millimeters (mm). In some embodiments, the height of at least one of the first or second polymeric ribbons is greater than 750 micrometers. In some of these embodiments, the height of at least one of the first or second polymeric ribbons is in a range from greater than 750 micrometers to 3 mm (e.g., 0.775 mm to 2 mm or 0.8 mm to 1.5 mm). In some embodiments, the height of at least one of the first or second polymeric ribbons or polymeric strands is less than 750 micrometers. In some of these embodiments, the height of at least one of the polymeric ribbons or polymeric strands is in a range from 0.1 mm to less than 750 micrometers (e.g., 0.3 mm to 0.745 mm or 0.5 mm to 0.745 mm).

In the embodiment illustrated in FIG. 1, the polymeric ribbons 1, 11, each have a first major surface 2, 12 that is intermittently joined to a single polymeric strand 3. That is, in this embodiment, two or more polymeric strands are not joined to the first major surface of the polymeric ribbon. In other embodiments, in at least a portion of the polymeric netting, the major surface 2, 12 of at least one of the first or second polymeric ribbons 1, 11 is bonded to more than one polymeric strand. For example, the major surface 2, 12 of at least one of the first or second polymeric ribbons 1, 11 may be bonded to two polymeric strands.

When it is said that the first major surface of polymeric ribbon is intermittently joined to a polymeric strand, it can be observed that the polymeric strand oscillates between bonding to the polymeric ribbon and another portion of the netting on the opposite side of the polymeric strand. In the embodiment illustrated in FIG. 1, two adjacent polymeric ribbons 1, 11 are joined together by a single polymeric strand 3 at least partially alternately bonded to the two adjacent polymeric ribbons 1, 11. However, this is not a requirement. For example, in some embodiments, the polymeric strand can oscillate between bonding to the polymeric ribbon and a non-oscillating strand that does not necessarily have a height-to-width aspect ratio of at least three to one. Since a major surface of the polymeric ribbon is intermittently bonded to a polymeric strand, which is at least partially alternately bonded to the polymeric ribbon and another strand or ribbon of the netting, the polymeric ribbons are typically not intersected by the polymeric strands. In any of the embodiments of the polymeric netting disclosed herein, the strands and ribbons of polymer typically do not substantially intersect each other (e.g., at least 50 (at least 55, 60, 65, 70, 75, 80, 85, 90, 95, 99, or even 100) percent by number do not intersect each other) either by forming a superimposed intersection point or an interlaid intersection point.

In the embodiment illustrated in FIG. 1, the polymeric ribbons and polymeric strands alternate. In some embodiments of the polymeric netting according to the present disclosure and/or made according to the method disclosed herein, the polymeric strands 3 alternate with at least one of the first or second polymeric ribbons 11, 1 in at least a portion of the polymeric netting. This means one polymeric strand 3 is disposed between any two adjacent polymeric ribbons 1, 11, and one polymeric ribbon 1, 11 is disposed between any two adjacent polymeric strands. Furthermore, in some embodiments including the illustrated embodiment, one first polymeric ribbon 11 is disposed between any two adjacent second polymeric ribbons 1, and one second polymeric ribbon 1 is disposed between any two adjacent first polymeric ribbons 11.

As shown in FIG. 1, the polymeric netting 10 has first and second opposing major surfaces 5, 7 transverse to the major surfaces 2, 12 of the polymeric ribbons 1, 11. The first major surface 5 of the polymeric netting 10 comprises the second edges 6 of a second portion of the polymeric ribbons 11, and the second major surface 7 of the polymeric netting 10 comprises the first edges 8 of a first portion of the polymeric ribbons 1. The first portion of the polymeric ribbons 1 does not extend to the first major surface 5, and the second portion of the polymeric ribbons 11 does not extend to the second major surface 7. In the illustrated embodiment, neither the first nor second major surfaces 5, 7 comprise a portion of the polymeric strands 3. Also, in the illustrated embodiment, polymeric strands 3 are bonded to a major surface 2 of a first portion of polymeric ribbons 1 closer to the second edge 6 than the first edge 8, and polymeric strands 3 are bonded to major surface 12 of a second portion of polymeric ribbons 11 closer to the first edge 18 than the second edge 16. Furthermore, polymeric ribbons 1, 11 each have a center line 4, 14 bisecting major surface 2, 12, and first, top 8, 18 and second, bottom edges 6, 16 symmetrically disposed on opposite sides of the center line 4, 14. Some polymeric ribbons 11 are bonded to a polymeric strand 3 at a location between the center line 14 and the first, top edge 18, and some of the polymeric ribbons 1 are bonded to a polymeric strand 3 at a location between the center line 4 at the second, bottom edge 6.

Figure 2:
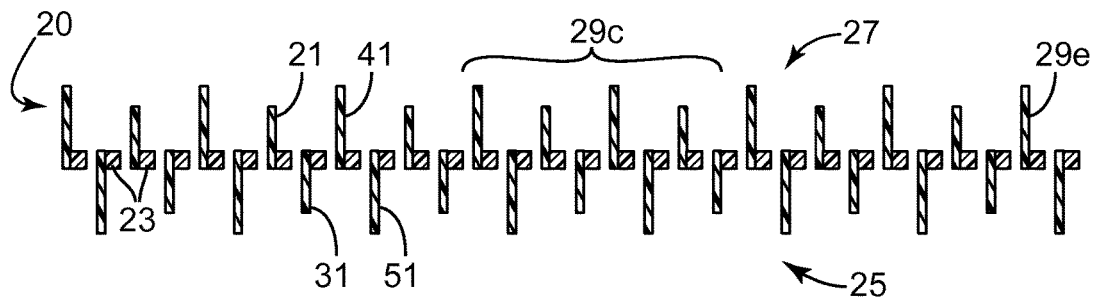
FIG. 2 is schematic cross-sectional view of a plane of another embodiment of a polymeric netting according to the present disclosure.

In FIG. 1, the heights h1 of the polymeric ribbons 1 are all about the same size, the heights of the polymeric ribbons 11 are all about the same, and the heights h3 of the polymeric strands 3 are all the same size, but as shown in FIG. 2, this is not a requirement. For example, there may be two different types of polymeric ribbons 21, 41 extending toward the second major surface 27 and two different types of polymeric ribbons 31, 51 extending toward the first major surface 25 as shown in FIG. 2. The height-to-width aspect ratio of polymeric ribbon 41 is greater than the height-to-width aspect ratio of polymeric ribbon 21, and the taller polymeric ribbons 41 and shorter polymeric ribbons 21 alternate across the polymeric netting 20. Similarly, the height-to-width aspect ratio of polymeric ribbon 51 is greater than the height-to-width aspect ratio of polymeric ribbon 31, and the taller polymeric ribbons 51 and shorter polymeric ribbons 31 alternate across the polymeric netting 20. At least some of the polymeric ribbons 21, 31, 41, 51 have a height-to-width aspect ratio of at least three to one. In other embodiments, the height-to-width aspect ratio of the polymeric ribbons is greater on the edges 29e of the polymeric netting 20 than in the center 29c.

While in FIGS. 1 and 2, the widths of the polymeric ribbons are each about the same, and the widths of the polymeric strands are all about the same, this is not a requirement. The widths of the polymeric ribbons and/or polymeric strands may change across the netting (e.g., in a direction transverse to the length of the polymeric ribbons and polymeric strands). For example, at least one of the polymeric ribbons or polymeric strands may have a larger width at the center of the netting 29c than on the edges 29e or vice versa.

While in FIGS. 1 and 2, the spacings between the various polymeric ribbons and polymeric strands in the polymeric netting are approximately equal, this is also not a requirement. The spacing between any two adjacent polymeric ribbons 1, 11, 21, 31, 41, 51 or any two adjacent polymeric strands 3, 23 can vary in the cross-web direction. For example, any two adjacent polymeric ribbons or any two adjacent polymeric strands may be positioned more closely together at the center of the netting than on the edges or vice versa. Furthermore, it should be noted that the spacing shown in the cross-sectional view of a plane of the polymeric netting shown in FIGS. 2 and 4 (described below) is idealized. In a typically cross-sectional planar view, not all of the polymeric strands would appear to be identically bonded to the major surfaces of the polymeric ribbons. Instead, the positions of the strands may appear to be more like that shown in the cross-sectional planar view of FIG. 3 and in the side view shown in FIG. 1.

Figure 3:
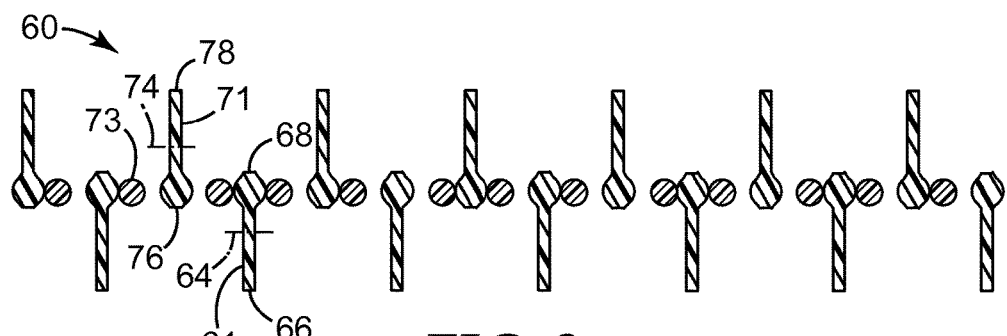
FIG. 3 is schematic cross-sectional view of a plane of still another embodiment of a polymeric netting according to the present disclosure.

Also in the embodiments illustrated in FIGS. 1 and 2, the width w1 of the polymeric ribbons is uniform from the top edge 8, 18 to the bottom edge 6, 16. Again, this is not a requirement. For example, a polymeric netting 60 having ribbons with non-uniform widths between the top and bottom edges is shown in FIG. 3. In polymeric netting 60, the width of the polymeric ribbon 71 is wider at a location including bottom edge 76 than at top edge 78. Similarly, the width of the polymeric ribbon 61 is wider at a location including top edge 68 than at bottom edge 66. That is, in the illustrated embodiment, the polymeric ribbons 61, 71 are wider at locations where they are bonded to polymeric strands 73. In other embodiments, the width of the polymeric ribbons can also be designed to change from their top edges to their bottom edges in other ways. For example, the width can be greater near the center lines 64, 74 than at the top edge 68, 78 and/or bottom edges 66, 76. The polymeric strands may be bonded to the polymeric ribbons 61 at these locations. The polymeric ribbons may also have random fluctuations in width caused by the extrusion process. In any situation in which the width of the polymeric ribbon is non-uniform, the width w1 of the polymeric ribbon for the purposes of determining the height-to-width aspect ratio is measured at its smallest width.

Similarly, the height of the polymeric ribbon may be measured at its tallest height. The heights of the polymeric ribbons are generally uniform. The polymeric ribbons in any of the embodiments of polymeric nettings disclosed herein typically would not have any discrete posts (e.g., mechanical fasteners or hooks) upstanding from the edges of the polymeric ribbons. Similarly, the polymeric nettings disclosed herein in any of their embodiments typically would not have any discrete posts (e.g., mechanical fasteners or hooks) on their first or second major surfaces.

Figure 4:
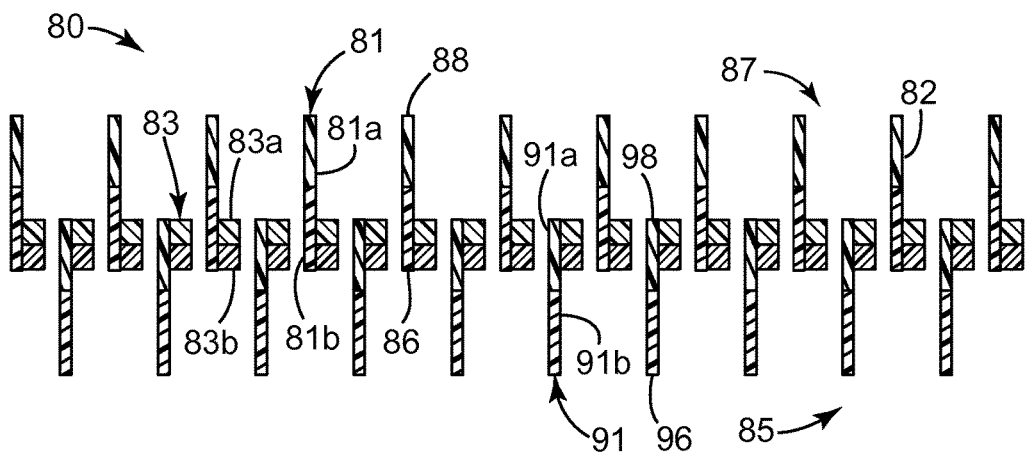
FIG. 4 is schematic cross-sectional view of a plane of yet another embodiment of a polymeric netting according to the present disclosure.

In some embodiments in which the polymeric ribbons each have a center line bisecting the major surface and first and second edges symmetrically disposed on opposite sides of the center line, for at least one of the first or second polymeric ribbons the first edges comprise a different polymeric composition than the second edges in at least a portion of the polymeric netting. An embodiment of such a polymeric netting is shown in FIG. 4. In FIG. 4, the polymeric netting 80 includes polymeric ribbons 81, 91 and polymeric strands 83. The polymeric ribbons 81, 91 each have a first portions 81a, 91a and second portions 81b, 91b. The first and second portions 81a and 81b are made from different polymeric compositions. The first and second portions 91a and 91b are made from different polymeric compositions. Likewise, the polymeric strands 83 each have a first portion 83a and a second portion 83b. In these embodiments, the polymeric netting 80 has first and second opposing major surfaces 85, 87 transverse to the major surfaces 82 of the polymeric ribbons 81. The first major surface 85 of the polymeric netting 80 comprises the first edges 96 of polymeric ribbons 91, and the second major surface 87 of the polymeric netting 80 comprises the second edges 88 of polymeric ribbons 81. The first portions 91a of the polymeric ribbons 91 and consequently the second edges 98 comprise a first polymeric composition, and the second portions 91b of the polymeric ribbons 91 and consequently the first edges 96 comprise a second polymeric composition. The first portions 81a of the polymeric ribbons 81 and consequently the second edges 88 comprise a first polymeric composition, and the second portions 81b of the polymeric ribbons 81 and consequently the first edges 86 comprise a second polymeric composition. Similarly, the first portions 83a of the polymeric strands comprise a third polymeric composition, and the second portions 83b of the polymeric strands 83 comprise a fourth polymeric composition. In the illustrated embodiment, at least the first and second polymeric compositions are different, and the first polymeric composition does not extend to the first edges 96 of the polymeric ribbons 91.

Although other methods may be useful, the polymeric nettings disclosed herein in any of their embodiments can conveniently be prepared by an extrusion die and/or method according to the present disclosure. The extrusion die according to the present disclosure has a variety of passageways from cavities within the die to dispensing orifices. The dispensing orifices each have a width, which is the dimension that corresponds to the width of a particular polymeric ribbon or polymeric strand, and a height, which is the dimension that corresponds to the thickness of the resulting extruded polymeric netting and the height of a particular polymeric ribbon or polymeric strand. The height of a dispensing orifice can also be considered the distance between the top edge and the bottom edge of the dispensing orifice.

In the extrusion die and method of making the polymeric netting according to the present disclosure, the extrusion die has at least one cavity, a dispensing surface, and fluid passageways between the at least one cavity and the dispensing surface. The dispensing surface has an array of first and third dispensing orifices interspersed with an array of discrete, substantially vertically aligned second dispensing orifices. This means that for any two first and/or third dispensing orifices, there is at least one second dispensing orifice between them. However, it is possible that for any two first and/or third dispensing orifices, there is more than one second dispensing orifice between them, and there may be dispensing orifices other than the second dispensing orifices between them. The array of first dispensing orifices is vertically and horizontally offset from the array of third dispensing orifices.

The fluid passageways are capable of physically separating the polymers from the at least one cavity (e.g., first and second cavities and optionally any further die cavities within the extrusion die) until the fluid passageways enter the dispensing orifices. The shape of the different passageways within the die may be identical or different. Examples of passageway cross-sectional shapes include round, square, and rectangular shapes. These cross-sectional shapes, selection of polymeric material, and die swell can influence the cross-sectional shape of the ribbons and strands.

In many embodiments, including the embodiments illustrated in FIGS. 5 to 15A and 15B, the extrusion die includes at least a first and second cavity, with first fluid passageways between the first cavity and the first dispensing orifices and second fluid passageways between the second cavity and the second dispensing orifices. The extrusion die may also have third fluid passageways between the first cavity or a third cavity and the third dispensing orifices. In the illustrated embodiment, the extrusion die has a third cavity, and the third fluid passageways are between the third cavity and the third dispensing orifices. At least one of the first dispensing orifices or third dispensing orifices have a height-to-width aspect ratio of at least 3:1 (in some embodiments, at least 5:1, 8:1, 10:1, 11:1, 15:1, 20:1, 30:1, or 40:1), and the height of at least one of the first and third dispensing orifices is typically larger than the height of the second dispensing orifices. In some embodiments, the height of at least one of the first dispensing orifices or third dispensing orifices is larger (in some embodiments, at least 2, 2.5, 3, 5, 10, or 20 times larger) than the height of the second dispensing orifices. In some embodiments, the first dispensing orifices, second dispensing orifices, third dispensing orifices, and any other dispensing orifices are arranged one-by-one across the dispensing surface. That is, in these embodiments, in the width dimension of the die, the dispensing orifices are arranged singly or one-by-one regardless of the alignment of the dispensing orifices in these embodiments. For example, the dispensing orifices are not stacked in a group of two, three, or more in the height direction, and one first or third dispensing orifice is disposed between any two adjacent second dispensing orifices. Furthermore, in some embodiments, one first dispensing orifice is disposed between any two adjacent third dispensing orifices, and one third dispensing orifice is disposed between any two adjacent first dispensing orifices. In other embodiments, there may be more than one second dispensing orifices (e.g., two) stacked in the height direction and interspersed between the first and third dispensing orifices.

In the method according to the present disclosure, polymeric ribbons are dispensed from the first dispensing orifices at a first speed, polymeric strands are dispensed from the second dispensing orifices at a second speed, and second polymeric ribbons are dispensed from the third dispensing orifices at a third speed to provide the polymeric netting. The second speed is at least twice the first speed and at least twice the third speed. In some embodiments, the second speed is in a range from 2 to 6 or from 2 to 4 times the first speed. In some embodiments, the second speed is in a range from 2 to 6 or from 2 to 4 times the third speed. The first and the third speed may be the same or different. In some embodiments in which the extrusion die includes at least first and second cavities, the first cavity of the extrusion die is supplied with a first polymeric composition at a first pressure so as to dispense the polymeric ribbons from the array of first dispensing orifices at a first speed, the second cavity of the extrusion die is supplied with a second polymeric composition at a second pressure so as to dispense the polymeric strands from the array of second dispensing orifices at a second speed, the third cavity of the extrusion die is supplied with a third polymeric composition at a third pressure so as to dispense the second polymeric ribbons from the array of third dispensing orifices at a third speed, wherein the second speed is at least 2 (in some embodiments, 2 to 6, or 2 to 4) times the first speed and, independently, the third speed. The first and the third speed may be the same or different.

While either the polymeric ribbons or polymeric strands may be made to oscillate, typically larger bond areas are observed when the polymeric strands (which are shorter in some embodiments) are oscillating. Therefore, in the methods described below, the polymeric strand is described as the oscillating strand.

The size of the polymeric ribbons and polymeric strands can be adjusted, for example, by the composition of the extruded polymers, velocity of the extruded strands, and/or the orifice design (e.g., cross sectional area (e.g., height and/or width of the orifices)). As taught in Int. Pat. App. Pub. No. WO 2013/028654 (Ausen et al.), a dispensing surface with a first polymer orifice three times greater in area than the second polymer orifice may not generate a net with polymeric ribbons with a height greater than the polymeric strands depending on the identity of the polymeric compositions and the pressure within the cavities. In some embodiments of the extrusion die and method according to the present disclosure, the height-to-width aspect ratio of the orifices is at least 5:1.

Conveniently, the extrusion die according to and/or useful for practicing the present disclosure may be comprised of a plurality of shims. The plurality of shims together define the at least one cavity, the dispensing surface, and the fluid passageways between the at least one cavity and the dispensing surface. In some embodiments, the plurality of shims comprises a plurality of sequences of shims wherein each sequence comprises at least one first shim that provides a first fluid passageway between the at least one cavity and at least one of the first dispensing orifices, at least one second shim that provides a second fluid passageway between the at least one cavity and at least one of the second dispensing orifices, and at least one third shim that provides a third fluid passageway between the at least one cavity and at least one of the third dispensing orifices. In some embodiments, the shims together define a first cavity and a second cavity, the extrusion die having a plurality of first dispensing orifices in fluid communication with the first cavity, a plurality of second dispensing orifices in fluid communication with the second cavity, and a plurality of third dispensing orifices in fluid communication with the first cavity or a third cavity (in some embodiments, the third cavity).

In some embodiments, the shims will be assembled according to a plan that provides a sequence of shims of diverse types. Since different applications may have different requirements, the sequences can have diverse numbers of shims. The sequence may be a repeating sequence that is not limited to a particular number of repeats in a particular zone. Or the sequence may not regularly repeat, but different sequences of shims may be used.

Figure 5:
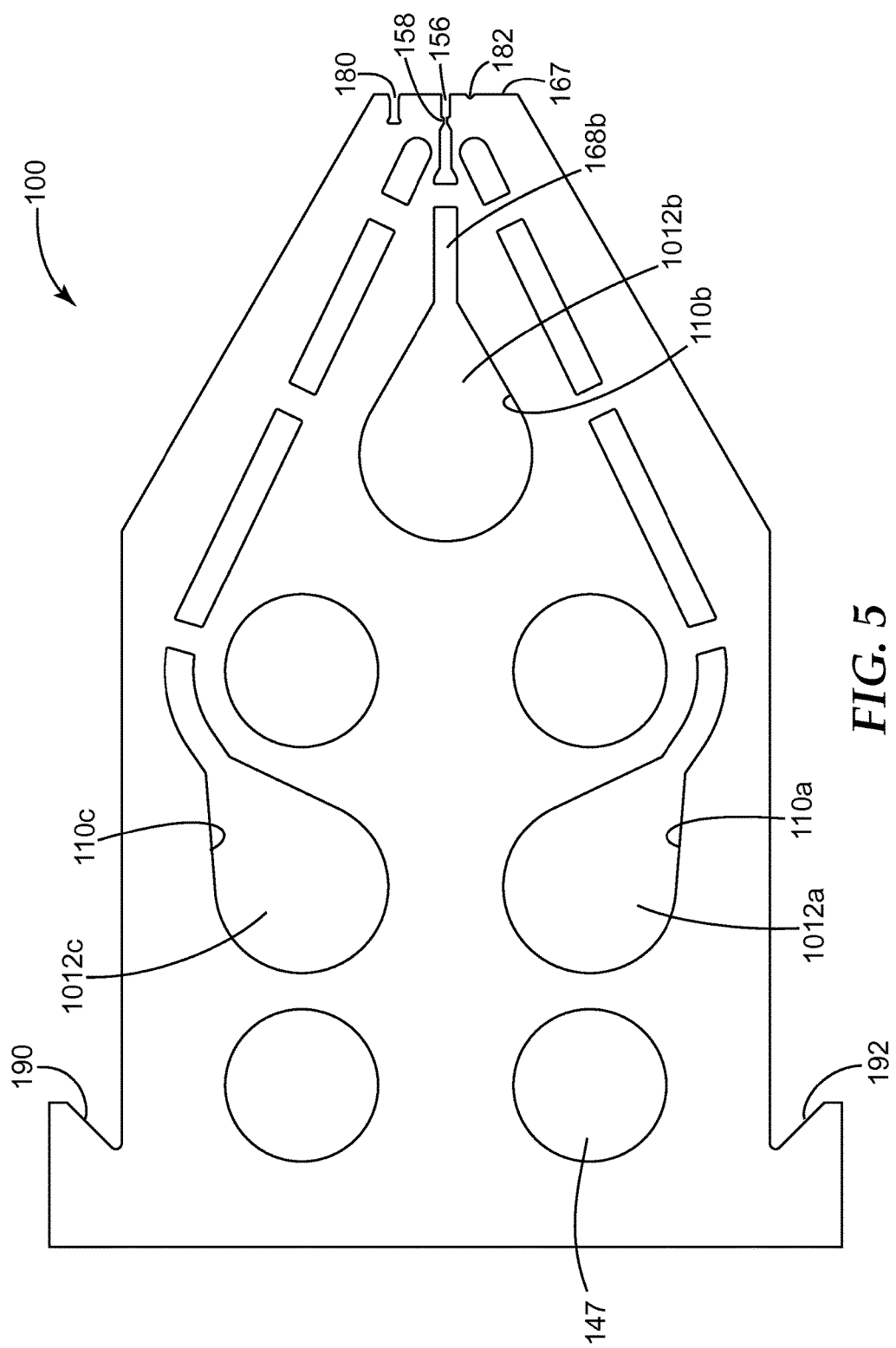
FIG. 5 is a plan view of an embodiment of a shim suitable for a sequence of shims capable of forming a polymeric netting as shown, for example, in FIGS. 1 and 2.
Figure 6:
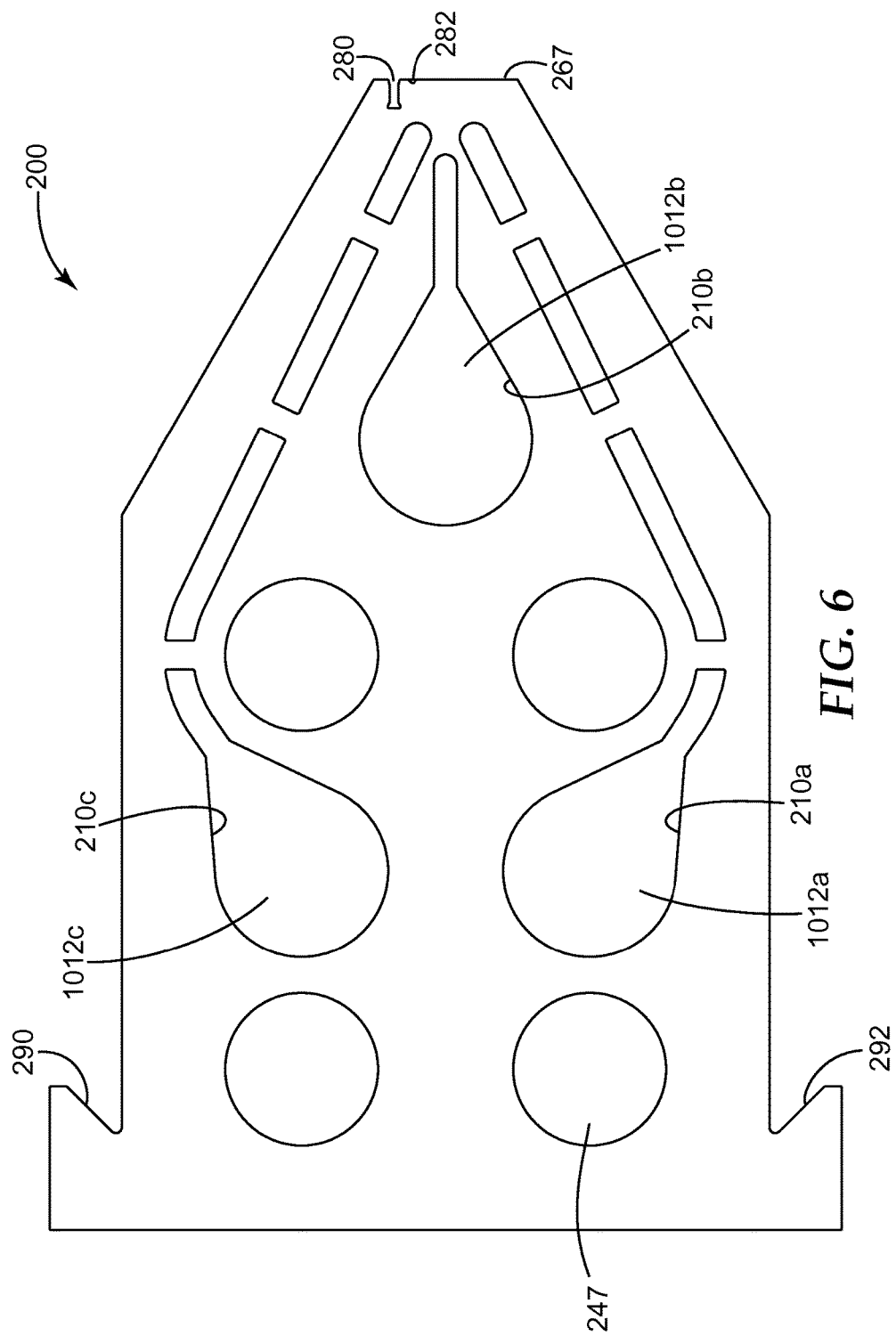
FIG. 6 is a plan view of another embodiment of a shim suitable for a sequence of shims capable of forming a polymeric netting as shown, for example, in FIGS. 1 and 2.
Figure 7:
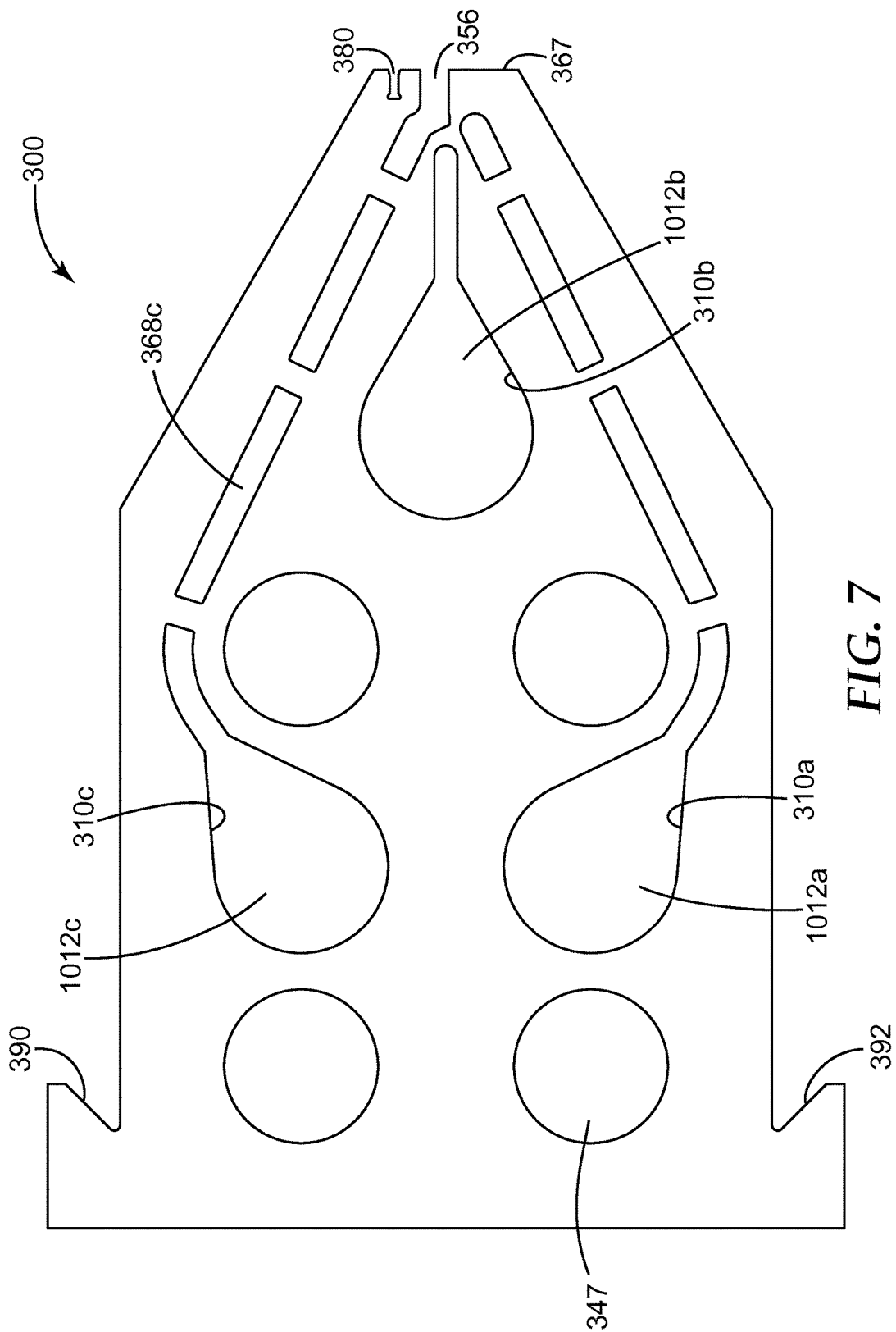
FIG. 7 is a plan view of another embodiment of a shim suitable for a sequence of shims capable of forming a polymeric netting as shown, for example, in FIGS. 1 and 2.
Figure 8:
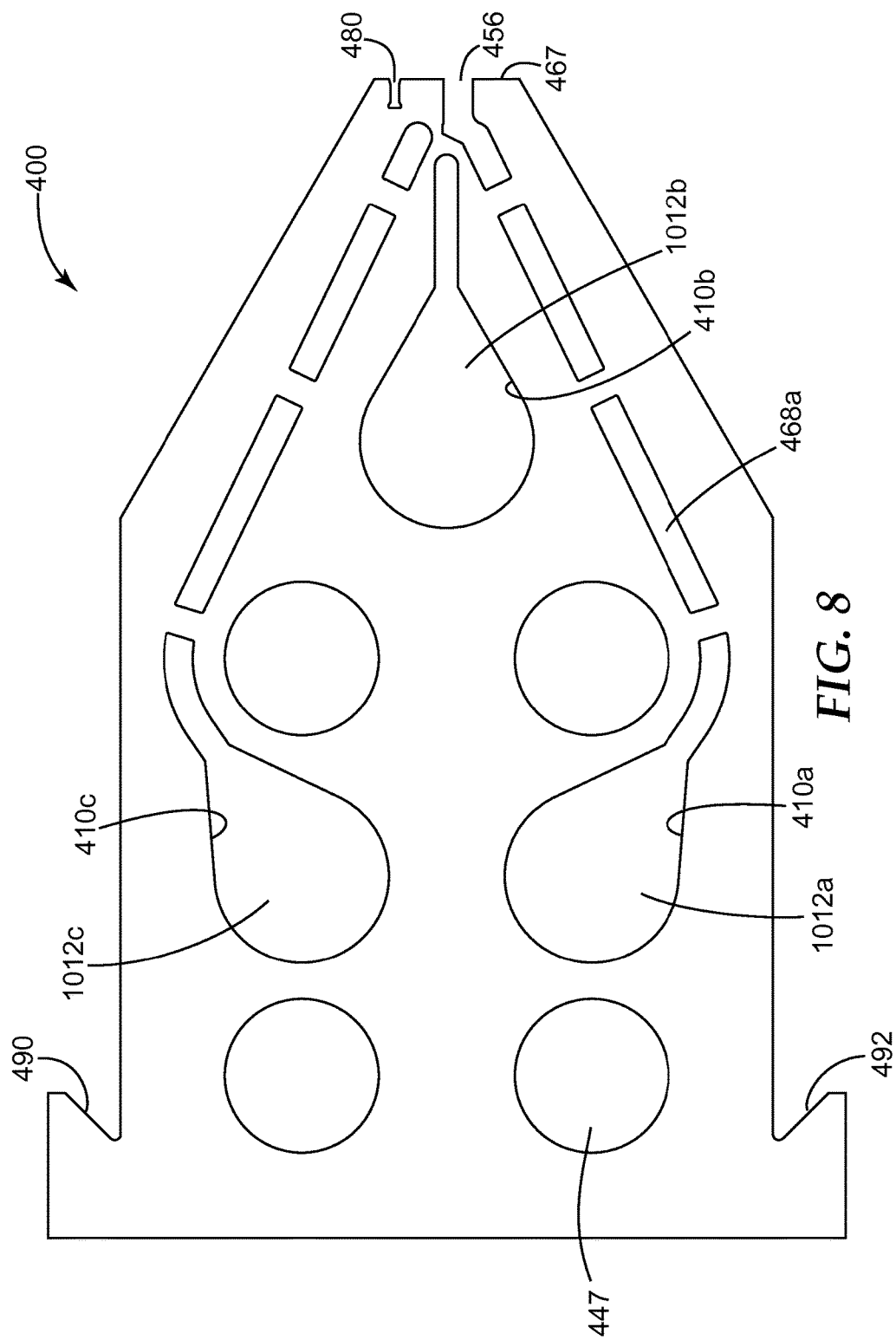
FIG. 8 is a plan view of another embodiment of a shim suitable for a sequence of shims capable of forming a polymeric netting as shown, for example, in FIGS. 1 and 2.

A plurality of shims that is useful for providing a polymeric netting according to the present disclosure is shown in FIGS. 5 to 8, 9A, and 9B. Referring now to FIG. 5, a plan view of shim 100 is illustrated. Shim 100 is useful in a sequence of shims 1000 shown in FIGS. 9A and 9B. Other shims useful in this sequence are shown in FIGS. 6 to 8. Shim 100 has first aperture 110a, second aperture 110b, and third aperture 110c. When shim sequence 1000 is assembled, first apertures 110a, 210a, 310a, and 410a in shims 100, 200, 300, and 400 together define at least a portion of first cavity 1012a. Similarly, second apertures 110b, 210b, 310b, and 410b in shims 100, 200, 300, and 400 together define at least a portion of second cavity 1012b, and third apertures 110c, 210c, 310c, and 410c in shims 100, 200, 300, and 400 together define at least a portion of third cavity 1012c. Shim 100 has several holes 147 to allow the passage of, for example, bolts to hold shim 100 and others to be described below into an assembly. Shim 100 has dispensing surface 167, and in this particular embodiment, dispensing surface 167 has indexing groove 180, which is useful for conveniently aligning the shims with an appropriately shaped key during assembly of the shims into a die, and identification notch 182 to help verify that the die has been assembled in the desired manner. Shim 100 has shoulders 190 and 192, which can be conveniently engaged by compression blocks 2204 described below in connection with FIGS. 10 and 11. Shim 100 has dispensing opening 156 but no integral connection between dispensing opening 156 and any of apertures 110a, 110b, or 110c. There is no connection, for example, from cavity 1012b to dispensing opening 156, via, for example, passageway 168b, but the flow has a route 1068b to the dispensing surface when shim 100 is assembled with shims 200, 300, and 400 as illustrated in assembly drawing (see shim sequence 1000 in FIG. 9A). The dimensions of duct leading to dispensing opening 156, and especially dispensing opening 156 at its end, can be designed to provide the dimensions desired in the polymer strands extruded from them. The dimensions of dispensing opening 156 and the dimensions of passageway 158 also influence the desired strand speed.

Referring now to FIG. 6, a plan view of shim 200 is illustrated. Shim 200 has first aperture 210a, second aperture 210b, and third aperture 210c. When shim 200 is assembled with others as shown in FIG. 9A, aperture 210a helps define first cavity 1012a, aperture 210b helps define second cavity 1012b, and aperture 210c helps define third cavity 1012c. Shim 200 has several holes 247 to allow the passage of, for example, bolts to hold shim 200 and others to be described below into an assembly. Shim 200 has dispensing surface 267, and in this particular embodiment, dispensing surface 267 has indexing groove 280 and identification notch 282. Shim 200 also has shoulders 290 and 292. There is no passage from any of the cavities to dispensing surface 267 since this shim creates a non-dispensing area along the width of the die. In use shim(s) 200 separates shims 100 producing polymeric strands 3 from shims 300 producing polymeric ribbons 1 and shims 100 producing polymeric strands 3 from shims 400 producing polymeric ribbons 11.

Referring now to FIG. 7, a plan view of shim 300 is illustrated. Shim 300 has first aperture 310a, second aperture 310b, and third aperture 310c. When shim 300 is assembled with others as shown in FIG. 9A, aperture 310a helps define first cavity 1012a, aperture 310b helps define second cavity 1012b, and aperture 310c helps define third cavity 1012c. Shim 300 has several holes 347 to allow the passage of, for example, bolts to hold shim 300 and others to be described below into an assembly. Shim 300 has dispensing surface 367, and in this particular embodiment, dispensing surface 367 has indexing groove 380. Shim 300 also has shoulders 390 and 392. Shim 300 has dispensing opening 356 but no integral connection between dispensing opening 356 and any of and any of apertures 310a, 310b, or 310c. There is no connection, for example, from aperture 310c to dispensing opening 356, via, for example, passageway 368c, but the flow has a route 1068c to the dispensing surface when shim 300 is assembled with shims 100 and 200 as illustrated in sequence 1000 (see FIG. 9A). Comparing FIG. 7 with FIG. 5, one observes that dispensing opening 356 is bigger than dispensing opening 156. In some embodiments, dispensing opening 356 is at least twice the size of dispensing opening 156. In some embodiments, dispensing opening 356 is at least 2.5, 3, 5, 10, or 20 times bigger than dispensing opening 156.

Referring now to FIG. 8, a plan view of shim 400 is illustrated. Shim 400 is similar to shim 300, shown in FIG. 7. Shim 400 has first aperture 410a, second aperture 410b, and third aperture 410c. When shim 400 is assembled with others as shown in FIGS. 9A and 9B, aperture 410a helps define first cavity 1012a, aperture 410b helps define second cavity 1012b, and aperture 410c helps define third cavity 1012c. Shim 400 has several holes 447 to allow the passage of, for example, bolts to hold shim 400 and others to be described below into an assembly. Shim 400 has dispensing surface 467, and in this particular embodiment, dispensing surface 467 has indexing groove 480. Shim 400 also has shoulders 490 and 492. Shim 400 has dispensing opening 456 but has no integral connection between dispensing opening 456 and any of apertures 410a, 410b, or 410c. There is no connection, for example, from aperture 410a to dispensing opening 456, via, for example, passageway 468a, but the flow has a route 1068a to the dispensing surface when shim 400 is assembled with shims 100, 200, and 300 as illustrated in assembly drawing (see FIG. 9A). As in FIG. 7, dispensing opening 456 is bigger than dispensing opening 156. In some embodiments, dispensing opening 456 is at least twice the size of dispensing opening 156. In some embodiments, dispensing opening 456 is at least 2.5, 3, 5, 10, or 20 times bigger than dispensing opening 156.

FIGS. 9A and 9B illustrate a perspective assembly drawing of a sequence of shims, collectively 1000, employing the shims of FIGS. 5, 6, 7, and 8 so as to produce a polymeric netting 10 as shown in FIG. 1. Proceeding left to right, the sequence 1000 comprises two shims 400 that can extrude first polymeric ribbons 11, two shims 200, two shims 100 that can extrude polymeric strands 3, two shims 200, two shims 300 that can extrude second polymeric ribbons 1, two shims 200, two shims 100 that can extrude polymeric strands 3, and two shims 200. The first dispensing orifices 1001, 1011 each have a height-to-width aspect ratio of at least three to one (in some embodiments, at least 5:1, 8:1, 10:1, 11:1, 15:1, 20:1, 30:1, or 40:1). First and third dispensing orifices 1011, 1001 and second dispensing orifices 1003 are separated by shims 200, which causes the separation of polymeric ribbons 1, 11 from polymeric strands 3 in the polymeric netting 10. At least one of the height h1011 of the first dispensing orifices or the height h1001 of the third dispensing orifices is at least 2, 2.5, 3, 5, 10, or 20 times larger than the height h1003 of the second dispensing orifices. In the method disclosed herein polymer from first cavity 1012a emerges as first polymeric ribbons 11 from first dispensing orifices 1011, polymer from second cavity 1012b emerges as oscillating strands 3 from second dispensing orifices 1003, and polymer from third cavity 1012c emerges as second polymeric ribbons 1 from third dispensing orifices 1001. The dimensions of the fluid passageways and the pressures in the cavities are typically selected so that the speed of oscillating polymeric strands 3 is between about 2 and 6 (in some embodiments, 2 and 4) times greater than the speed of the first and second polymeric ribbons 11, 1.

In the embodiment illustrated in FIGS. 9A and 9B, the second dispensing orifices 1003 are positioned closer to the top edges of the first dispensing orifices 1011 than the bottom edges of the first dispensing orifices 1011, and the second dispensing orifices 1003 are positioned closer to the bottom edges of the third dispensing orifices 1001 than the top edges of the third dispensing orifices 1001. In other embodiments, it is possible to make the top edges of first dispensing orifices substantially aligned with the top edges of the second dispensing orifices and the bottom edges of the third dispensing openings substantially aligned with the bottom edges of the second dispensing orifices. However, it can be useful to have the second dispensing openings positioned somewhat above the bottom of the third dispensing opening and below the top of the first dispensing openings, because the oscillating strand typically has more die swell, and a larger bond area can be achieved.

Modifications of the sequence 1000 shown in FIGS. 9A and 9B can be used in combination with sequence 1000, for example, to make the polymeric nettings 20, 60, and 80, as shown in FIGS. 2, 3, and 4. To make polymeric netting 20 shown in FIG. 2, sequence 1000 can be alternated with another sequence similar to 1000 in which shims 300 and 400 have somewhat smaller openings 356, 456, for example. While shims 300, 400 can be useful for extruding polymeric ribbons 41, 51, shims with somewhat smaller openings 356, 456 can be useful for extruding polymeric ribbons 21, 31. In some embodiments, sequence 1000 can be alternated with another sequence similar to 1000 in which one of shim 300 or 400 is replaced by shim 100, and the flow rate of the polymer coming from cavity 1012a or 1012c can be adjusted so that this strand does not oscillate. This sequence can make a polymeric netting in which a polymeric strand 3 oscillates between bonding to the first or second polymeric ribbon 11, 1 and bonding to a non-oscillating strand that does not necessarily have a height-to-width aspect ratio of at least three to one. Also, sequence 1000 can be combined with similar sequences in which at least one of shim 300 or 400 is modified to have progressively smaller openings 356, 456 for example, to provide a plurality of shim sequences. Such a plurality of shim sequences can be repeated to provide a polymeric netting in which the polymeric ribbons are shorter toward the center of the polymeric netting 29c than the edges 29e, or vice versa.

A modification of the shim sequence shown in FIGS. 9A and 9B may be useful for providing polymeric nettings such as those shown in FIG. 3. Thin shims having small openings can be positioned on either side of shims 400, 300 such that these openings are positioned closer to the top edges of the first dispensing orifices 1011 than the bottom edges of the first dispensing orifices 1011, and these openings are positioned closer to the bottom edges of the third dispensing orifices 1001 than the top edges of the third dispensing orifices 1001. The shims on either side of shim 400 can be in communication with cavity 1012a so that more polymer is extruded from cavity 1012a near the top edges of dispensing orifice 1011. Similarly the shims on either side of shim 300 can be in communication with cavity 1012c so that more polymer is extruded from cavity 1012c near the bottom edges of dispensing orifice 1001.

Figure 11:
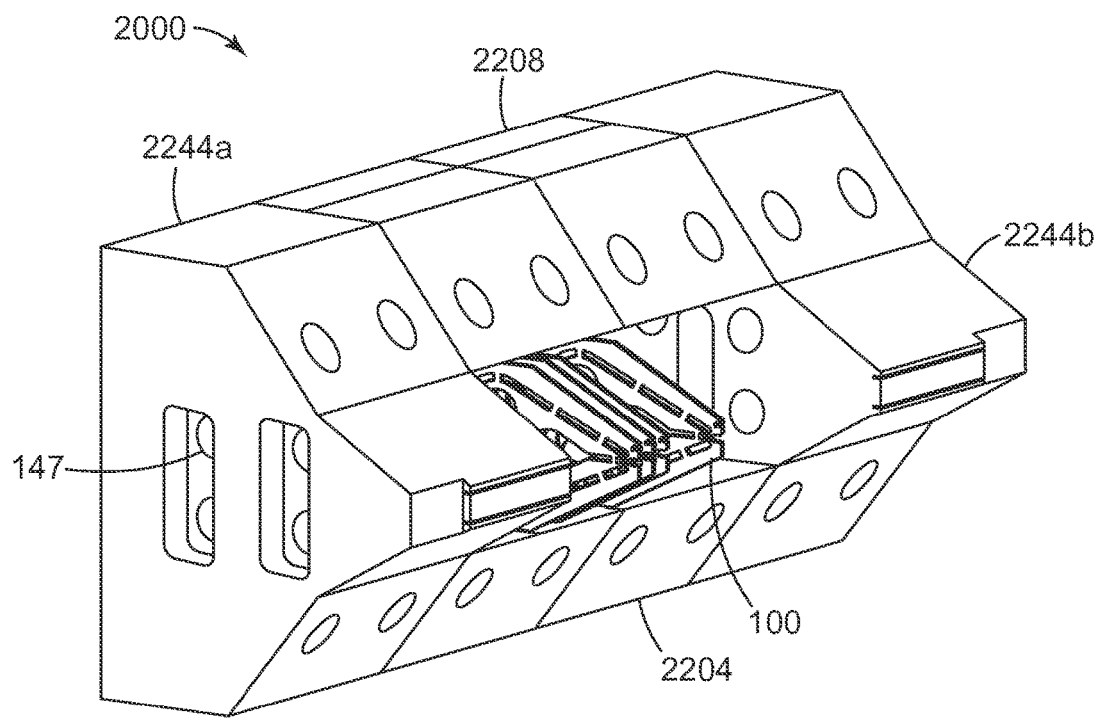
FIG. 11 is a perspective view of the mount of FIG. 10 in an assembled state.

An exploded perspective view of an embodiment of a mount suitable for an extrusion die composed of multiple repeats of the sequence of shims is illustrated in FIGS. 10 and 11. In some embodiments of extrusion dies described herein, there will be a large number of very thin shims (typically several thousand shims; in some embodiments, at least 1000, 2000, 3000, 4000, 5000, 6000, 7000, 8000, 9000, or even at least 10,000), of diverse types (e.g., shims 100, 200, and 300), compressed between two end blocks (e.g., 2244a and 2244b). Conveniently, through bolts can be used to assemble the shims to the end blocks 2244a and 2244b, passing through holes 147 in the shims. Inlet fittings 2250a, 2250b, and 2250c are provided on end blocks 2244a and 2244b respectively to introduce the materials to be extruded into extrusion die 2000. In some embodiments, inlet fittings 2250a, 2250b, and 2250c are connected to melt trains of conventional type. In some embodiments, cartridge heaters 2052 are inserted into receptacles extrusion die 2000 to maintain the materials to be extruded at a desirable temperature while in the die. The ordinary artisan may perceive alternatives for assembling the extrusion die other than that shown in the illustrated embodiment. In some embodiments, the assembled shims (conveniently bolted between the end blocks) further comprise a manifold body (not shown) for supporting the shims. The manifold body has at least one (or more (e.g., two or three, four, or more)) manifold therein, the manifold having an outlet. An expansion seal (e.g., made of copper or alloys thereof) is disposed so as to seal the manifold body and the shims, such that the expansion seal defines a portion of at least one of the cavities (in some embodiments, a portion of all the cavities), and such that the expansion seal allows a conduit between the manifold and the cavity.

Compression blocks 2204 have a notch 2206 that conveniently engages the shoulders on the shims (e.g., 190 and 192 on 100). When mount 2000 is completely assembled, compression blocks 2204 are attached by, for example, machine bolts to backplates 2208. Referring now to FIG. 11, a perspective view of mount 2000 of FIG. 10 is illustrated in a partially assembled state. A few shims (e.g., 100) are in their assembled positions to show how they fit within mount 2000, but most of the shims that would make up an assembled die have been omitted for visual clarity.

In any of the shims and sequences described above, the shims can have thicknesses in the range from 50 micrometers to 500 micrometers, although thicknesses outside of this range may also be useful. For wider fluid passageways and dispensing orifices, several smaller thickness shims may be stacked together, or single shims of the desired passageway width may be used. The shims are typically metal, for example, stainless steel. To reduce size changes with heat cycling, metal shims are typically heat-treated. The shims can be made by conventional techniques, including wire electrical discharge and laser machining. Often, a plurality of shims are made at the same time by stacking a plurality of sheets and then creating the desired openings simultaneously. Variability of the flow channels is preferably within 0.025 mm (1 mil), more preferably, within 0.013 mm (0.5 mil). The shims are tightly compressed to prevent gaps between the shims and polymer leakage. For example, 12 mm (0.5 inch) diameter bolts are typically used and tightened, at the extrusion temperature, to their recommended torque rating. Also, the shims are aligned to provide uniform extrusion out the extrusion orifice, as misalignment can lead to strands extruding at an angle out of the die which inhibits desired bonding of the net. As described above, to aid in alignment, an indexing groove can be cut into the shims to receive an alignment key. Also, a vibrating table can be useful to provide a smooth surface alignment of the extrusion tip.

Typically, the fluid passageways have heights in a range from 50 micrometers to 3 mm, and lengths less than 5 mm (with generally a preference for smaller lengths for decreasingly smaller passageway thicknesses), although heights and lengths outside of these ranges may also be useful. The height of at least one of the first or third dispensing orifices may be in a range from 50 micrometers to 3 millimeters (mm). In some embodiments, the height of at least one of the first or third dispensing orifices is greater than 750 micrometers. In some of these embodiments, the height of at least one of the first or third dispensing orifices is in a range from greater than 750 micrometers to 3 mm (e.g., 0.775 mm to 3 mm or 0.8 mm to 2.6 mm). In some embodiments, the height of at least one of the first, second, or third dispensing orifices is less than 750 micrometers. In some of these embodiments, the height of at least one of the first, second, or third dispensing orifices is in a range from 0.1 mm to less than 750 micrometers (e.g., 0.3 mm to 0.745 mm or 0.5 mm to 0.745 mm).

In some embodiments of the dies useful for extruding a polymer, each of the first, second, and third dispensing orifices have a width, and the first, second, and third dispensing orifices are separated by at least the width of the respective dispensing orifice and up to 2 times the width of the respective dispensing orifice. When the dispensing orifices have different widths, the separation between orifices may be at least the width of the widest opening and up to 2 times the width of the widest opening. The spacing between orifices should be sufficient to maintain a distance between adjacent strands and ribbons as they exit the die. This spacing accommodates die swell at the dispensing tip. If the spacing between orifices is too great, the strands and ribbons will not repeatedly collide with the first and second polymeric ribbons and will not form the repeating bonds of the polymeric netting.

In general, it has been observed that the rate of strand bonding is proportional to the extrusion speed of the polymeric strands, which are typically extruded at the second, faster speed. Further, it has been observed that this bonding rate can be increased, for example, by increasing the polymer flow rate for a given orifice size, or by decreasing the orifice area for a given polymer flow rate. It has also been observed that the distance between bonds is inversely proportional to the rate of strand bonding, and proportional to the speed that the net is drawn away from the die. Thus, it is believed that the distance between bonds and the net basis weight can be independently controlled by design of the orifice cross sectional area, the takeaway speed, and the extrusion rate of the polymer. For example, relatively high basis weight nettings, with a relatively short bond pitch can be made by extruding at a relatively high polymer flow rate, with a relatively low netting takeaway speed, using a die with a relatively small second orifice area.

In some embodiments, it may be useful to have the number of polymeric ribbons present per centimeter of cross direction width vary across the width of the polymeric netting. One way of achieving this is to apply a spreading force to at least a portion of the polymeric netting, such as by running the web over a bowed roller, diverging rails, or diverging disks. Once spread, attaching polymeric netting to another layer (e.g., a carrier or a layer in an absorbent article as described below) can be useful for maintaining the web in this spread open condition. Spreading in the cross direction causes the openings in the polymeric netting to become larger in the cross direction with the original dimension of the individual openings in the machine direction defined by the average machine direction spacing of contacts between the polymeric ribbons and the polymeric strands. In some embodiments it may be desirable to stretch the polymeric netting in the machine direction or in both a cross direction and the machine direction to create larger opening and/or to reduce the weight and cost of the polymeric netting on a per unit area basis. Monoaxial stretching in the machine direction, which is the lengthwise direction of the polymeric ribbons and polymeric strands, can be performed by propelling the web over rolls of increasing speed. A versatile stretching method that allows for monoaxial, sequential biaxial, or simultaneous biaxial stretching of a thermoplastic web employs a flat film tenter apparatus. Such an apparatus grasps the web using a plurality of clips, grippers, or other edge-grasping means along opposing edges of the thermoplastic web in such a way that monoaxial, sequential biaxial, or simultaneous biaxial stretching in the desired direction is obtained by propelling the grasping means at varying speeds along divergent rails. Increasing clip speed in the machine direction generally results in machine-direction stretching. Monoaxial and biaxial stretching can be accomplished, for example, by the methods and apparatus disclosed in U.S. Pat. No. 7,897,078 (Petersen et al.) and the references cited therein. Flat film tenter stretching apparatuses are commercially available, for example, from Brückner Maschinenbau GmbH, Siegsdorf, Germany.

Although in the embodiments shown in FIGS. 5 to 8, 9A, and 9B, the first, second, and third dispensing orifices all overlap with each other, this is not a requirement. In some embodiments, the first dispensing orifices are collinear with each other, the second dispensing orifices are collinear with each other, and the third dispensing orifices are collinear with each other, but none of the arrays of the first, second, or third dispensing orifices overlap. When the dispensing orifices do not overlap with each other, it may be desirable to extrude the strands horizontally.

While the embodiments of the extrusion die and method described above in connection with FIGS. 5 to 8, 9A, and 9B supply polymeric ribbons and polymeric strands of a polymer netting from separate cavities, other embodiments include providing an extrusion die comprising a plurality of shims positioned adjacent to one another, the shims together defining a cavity, the extrusion die having a plurality of first, second, and third dispensing orifices in fluid communication with the cavity, such that the second dispensing orifices are alternated with the first and third dispensing orifices. In these embodiments, first polymeric ribbons are dispensed from the first dispensing orifices at a first speed, and second polymeric ribbons are dispensed from the third dispensing orifices at a third speed while simultaneously polymeric strands are dispensed from the second dispensing orifices at a second speed, wherein the second speed is at least 2 (in some embodiments, in a range from 2 to 6 or 4 to 6) times the first speed and, independently, the third speed. Since there is only one cavity, the polymeric ribbons and polymeric strands in the resulting netting are made from the same composition. To prepare a polymeric netting from an extrusion die having only one cavity, a shim sequence such as that shown in FIGS. 44 to 48 in Int. Pat. Appl. Pub. No. WO 2013/028654 (Ausen et al.) may be useful, with the modification that the shims providing the first and third dispensing orifices providing the polymeric ribbons have an aspect ratio of at least 3:1, 5:1, 7:1, or more and may lack a restriction set back from the dispensing orifice.

The polymeric compositions useful in the polymeric nettings and methods described above in any of their embodiments may be the same or different. In some embodiments, the polymeric ribbons and polymeric strands comprise different polymeric compositions. These nets can be prepared, for example, by extrusion using any embodiments of the method described above by using different polymeric compositions in the first, second, and optionally third cavities. The different polymeric compositions in the polymeric ribbons and polymeric strands may be selected for their surface properties or their bulk properties (e.g., tensile strength, elasticity, microstructure, color, refractive index, etc). Furthermore, polymeric compositions can be selected to provide specific functional or aesthetic properties in the polymeric netting such as hydrophilicity/hydrophobicity, elasticity, softness, hardness, stiffness, bendability, or colors. The term "different" in terms of polymeric compositions can also refer to at least one of (a) a difference of at least 2% in at least one infrared peak, (b) a difference of at least 2% in at least one nuclear magnetic resonance peak, (c) a difference of at least 2% in the number average molecular weight, or (d) a difference of at least 5% in polydispersity.

In any embodiments of the method disclosed herein, polymers used to make the polymeric ribbons and polymeric strands are selected to be compatible with each other such that the polymeric ribbons and polymeric strands bond together at bond regions. Bonding generally refers to melt-bonding, and the bonds between polymer strands and polymeric ribbons can be considered to be melt-bonded. The bonding occurs in a relatively short period of time (typically less than 1 second). The bond regions on the major surface of the polymeric ribbons, as well as the polymeric strands, typically cool through air and natural convection and/or radiation. In selecting polymers for the polymeric ribbons and polymeric strands, in some embodiments, it may be desirable to select polymers of bonding strands that have dipole interactions (or H-bonds) or covalent bonds. Bonding between polymer ribbons and strands has been observed to be improved by increasing the time that the polymeric ribbons and polymeric strands are molten to enable more interaction between polymers. Bonding of polymers has generally been observed to be improved by reducing the molecular weight of at least one polymer and or introducing an additional co-monomer to improve polymer interaction and/or reduce the rate or amount of crystallization.

Examples of polymeric materials from which the polymeric netting can be made include thermoplastic polymers. Suitable thermoplastic polymers for the polymeric nettings include polyolefin homopolymers such as polyethylene and polypropylene, copolymers of ethylene, propylene and/or butylene; copolymers containing ethylene such as ethylene vinyl acetate and ethylene acrylic acid; ionomers based on sodium or zinc salts of ethylene methacrylic acid or ethylene acrylic acid; polyvinyl chloride; polyvinylidene chloride; polystyrenes and polystyrene copolymers (styrene-maleic anhydride copolymers, styrene acrylonitrile copolymers); nylons; polyesters such as poly(ethylene terephthalate), polyethylene butyrate and polyethylene napthalate; polyamides such as poly(hexamethylene adipamide); polyurethanes; polycarbonates; poly(vinyl alcohol); ketones such as polyetheretherketone; polyphenylene sulfide; polyacrylates; cellulosics; fluoroplastics; polysulfones; silicone polymers; and mixtures thereof. The die and method according to the present disclosure may also be useful for co-extruding polymeric materials that can be crosslinked (e.g., by heat or radiation). When a heat curable resin is used, the die can be heated to start the cure so as to adjust the viscosity of the polymeric material and/or the pressure in the corresponding die cavity. In some embodiments, at least one of the polymeric ribbons or polymeric strands is made from a polyolefin (e.g., polyethylene, polypropylene, polybutylene, ethylene copolymers, propylene copolymers, butylene copolymers, and copolymers and blends of these materials).

In some embodiments, the first polymeric ribbons are elastic, the second polymeric ribbons are elastic, the polymeric strands are elastic, or any combination thereof. For example, the second polymeric composition may include thermoplastic elastomers such as ABA block copolymers, polyurethane elastomers, polyolefin elastomers (e.g., metallocene polyolefin elastomers), polyamide elastomers, ethylene vinyl acetate elastomers, polyvinyl ethers, acrylics, especially those having long chain alkyl groups, poly-alpha-olefins, asphaltics, silicones, polyester elastomers, and natural rubber. An ABA block copolymer elastomer generally is one where the A blocks are polystyrenic, and the B blocks are conjugated dienes (e.g., lower alkylene dienes). The A block is generally formed predominantly of substituted (e.g., alkylated) or unsubstituted styrenic moieties (e.g., polystyrene, poly(alphamethylstyrene), or poly(t-butylstyrene)), having an average molecular weight from about 4,000 to 50,000 grams per mole. The B block(s) is generally formed predominantly of conjugated dienes (e.g., isoprene, 1,3-butadiene, or ethylene-butylene monomers), which may be substituted or unsubstituted, and has an average molecular weight from about 5,000 to 500,000 grams per mole. The A and B blocks may be configured, for example, in linear, radial, or star configurations. An ABA block copolymer may contain multiple A and/or B blocks, which blocks may be made from the same or different monomers. A typical block copolymer is a linear ABA block copolymer, where the A blocks may be the same or different, or a block copolymer having more than three blocks, predominantly terminating with A blocks. Multi-block copolymers may contain, for example, a certain proportion of AB diblock copolymer, which tends to form a more tacky elastomeric film segment. Other elastic polymers can be blended with block copolymer elastomers, and various elastic polymers may be blended to have varying degrees of elastic properties.

Many types of thermoplastic elastomers are commercially available, including those from BASF, Florham Park, N.J., under the trade designation "STYROFLEX", from Kraton Polymers, Houston, Tex., under the trade designation "KRATON", from Dow Chemical, Midland, Mich., under the trade designation "PELLETHANE", "ENGAGE", "INFUSE", "VERSIFY", or "NORDEL", from DSM, Heerlen, Netherlands, under the trade designation "ARNITEL", from E. I. duPont de Nemours and Company, Wilmington, Del., under the trade designation "HYTREL", from Exxon-Mobil, Irving, Tex. under the trade designation "VISTAMAXX", and more.

Mixtures of any of the above-mentioned polymers may be useful in the polymeric nettings disclosed herein. For example, a polyolefin may be blended with an elastomeric polymer to lower the modulus of the polymeric composition, which may be desirable for certain application. Such a blend may or may not be elastic.

In some embodiments, polymeric materials from which polymeric netting can be made comprise a colorant (e.g., pigment and/or dye) for functional (e.g., optical effects) and/or aesthetic purposes (e.g., each has different color/shade). Suitable colorants are those known in the art for use in various polymeric materials. Exemplary colors imparted by the colorant include white, black, red, pink, orange, yellow, green, aqua, purple, and blue. In some embodiments, it is desirable level to have a certain degree of opacity for one or more of the polymeric materials. The amount of colorant(s) to be used in specific embodiments can be readily determined by those skilled in the (e.g., to achieve desired color, tone, opacity, transmissivity, etc.).

Figure 18A:
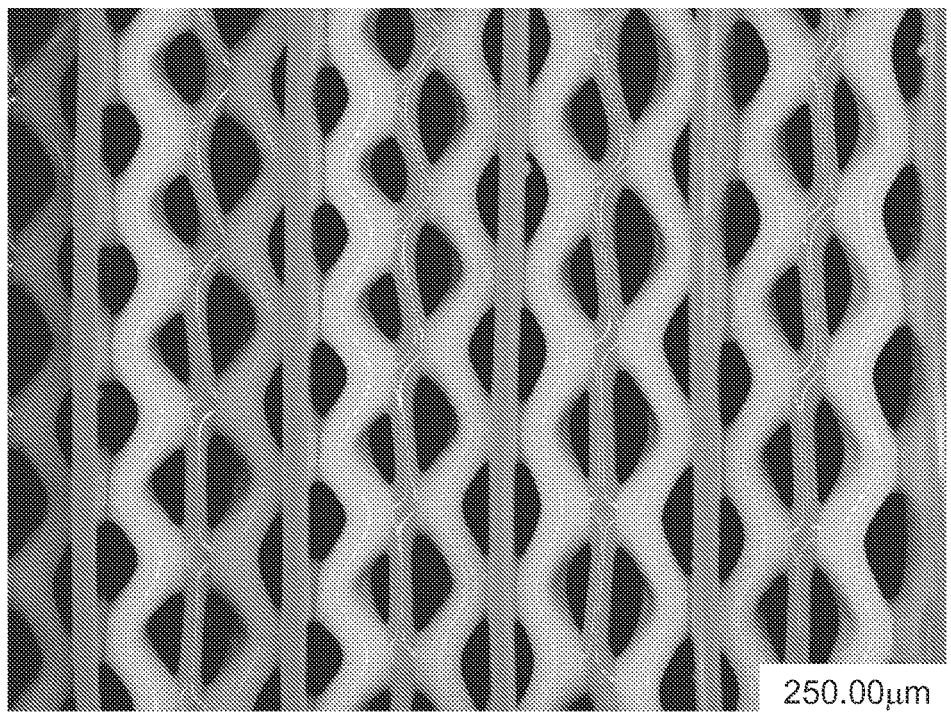
FIGS. 18A and 18B are photographs of top and side views, respectively, of the polymeric netting of Example 1.

The shape of the individual polymeric ribbons and polymeric strands in a polymeric netting disclosed herein can depend on a variety of factors. As described above, the polymeric strands, which are typically lower in height than the polymeric ribbons, may exit the die at a faster rate than the polymeric ribbons and may be oscillating. Therefore, in some embodiments, the polymeric ribbons may be substantially straight, for example, when no extension force is placed on the polymeric netting. However, depending on the difference in height between the polymeric ribbons and strands, the placement of the polymeric strands on the major surface of the polymeric ribbons, and the modulus of the materials from which the polymeric ribbons and polymeric strands are made, both the polymeric ribbons and polymeric strands may occupy a sinusoidal path in the lengthwise direction. FIG. 18A illustrates a top view of a polymeric netting disclosed herein in which a portion of the polymeric ribbons appear straight, and a portion of the polymeric ribbons appear to oscillate somewhat sinusoidally. In some embodiments, the polymeric ribbons may exit the die at a faster rate than the polymeric strands and may be oscillating.

In these embodiments, the polymeric strands may appear substantially straight, for example, when no extension force is placed on the polymeric netting.

In some embodiments, a single strand of the polymeric strands or a single ribbon of the polymeric ribbons in the netting may include different polymeric compositions. For example, one or more of the polymeric strands in the polymeric netting may have a core made of one polymeric composition and a sheath of a different polymeric composition. Such nets can be extruded as described in International Patent Application Publication No. WO 2013/032683 (Ausen et al.), the disclosure of which is incorporated herein by reference. Nets in which their opposing major surfaces are made from different polymeric compositions are described in International Application No. PCT/US2014/021494, filed Mar. 7, 2014.

As described above in connection with FIG. 4, in some embodiments, the polymeric ribbons each have a center line bisecting the major surface and first and second edges symmetrically disposed on opposite sides of the center line, wherein the first edges of the polymeric ribbons comprise a different composition than the second edges of the polymeric ribbons. In the illustrated embodiment, the polymeric strands also have a center line bisecting a major surface and first and second edges symmetrically disposed on opposite sides of the center line, wherein the first edges of the polymeric strands comprise a different composition than the second edges of the polymeric strands. A portion of the polymeric netting such as that indicated by polymeric netting 80 in FIG. 4 can conveniently be made, for example, using a shim sequence 3000 shown in FIGS. 15A and 15B. FIGS. 15A and 15B show a perspective assembly of a sequence of shims including shims 3100, 3200, and 3300, described below.

Figure 12A:
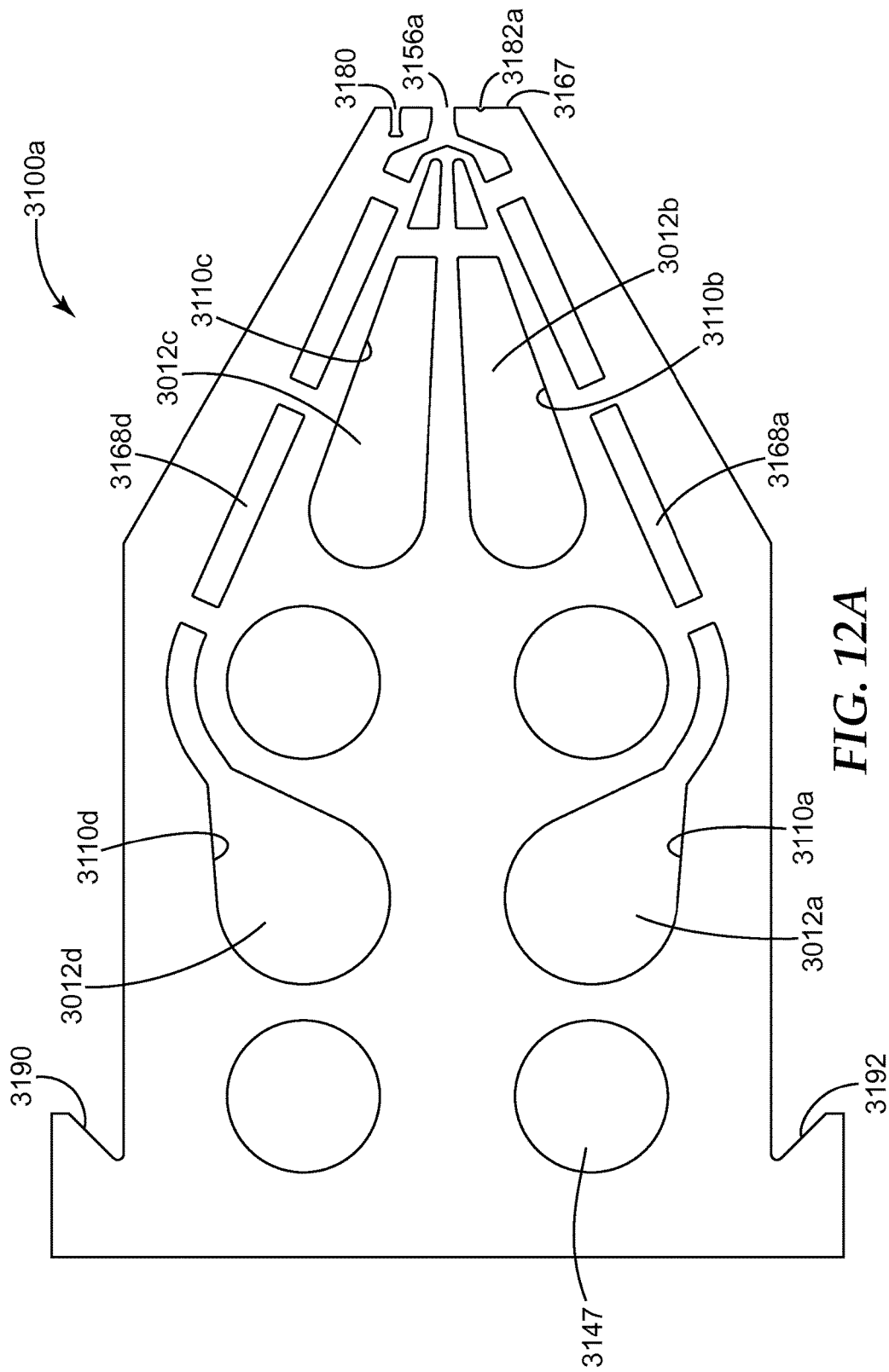
FIG. 12A is a plan view of an embodiment of a shim suited to form a sequence of shims useful for making a polymeric netting as shown, for example, in FIG. 4.

Referring now to FIG. 12A, a plan view of shim 3100a is illustrated. Shim 3100a has first aperture, 3110a, second aperture 3110b, a third aperture 3110c, and a fourth aperture 3110d. When shim 3100a is assembled with others as shown in FIGS. 15A and 15B, first aperture 3110a will help define first cavity 3012a, second aperture 3110b will help define second cavity 3012b, third aperture 3110c will help define third cavity 3012c, and fourth aperture 3110d will help define fourth cavity 3012d. As will be discussed with more particularity below, molten polymer in cavities 3012a and 3012d can be extruded into polymeric ribbons 81 having first and second portions 81a and 81b in two layers, and molten polymer in cavities 3012b and 3012c can be extruded into polymeric strands 83 having first and second portions 83a and 83b in two layers as shown in FIG. 4. Shim 3100a has several holes 3147 to allow the passage of, for example, bolts to hold shim 3100 and others to be described below into an assembly. Shim 3100 has dispensing opening 3156a in dispensing surface 3167. It might appear that there are no paths from apertures 3110a and 3110d to dispensing opening 3156a, via, for example, passageways 3168a and 3168d, but the flows have routes 3068a and 3068d in the perpendicular-to-the-plane-of-the-shim dimension when the sequence of FIG. 15A, for example, is completely assembled. Similar to shim 100, dispensing surface 3167 of shim 3100 has indexing groove 3180, identification notch 3182a, and shoulders 3190 and 3192.

Figure 12B:
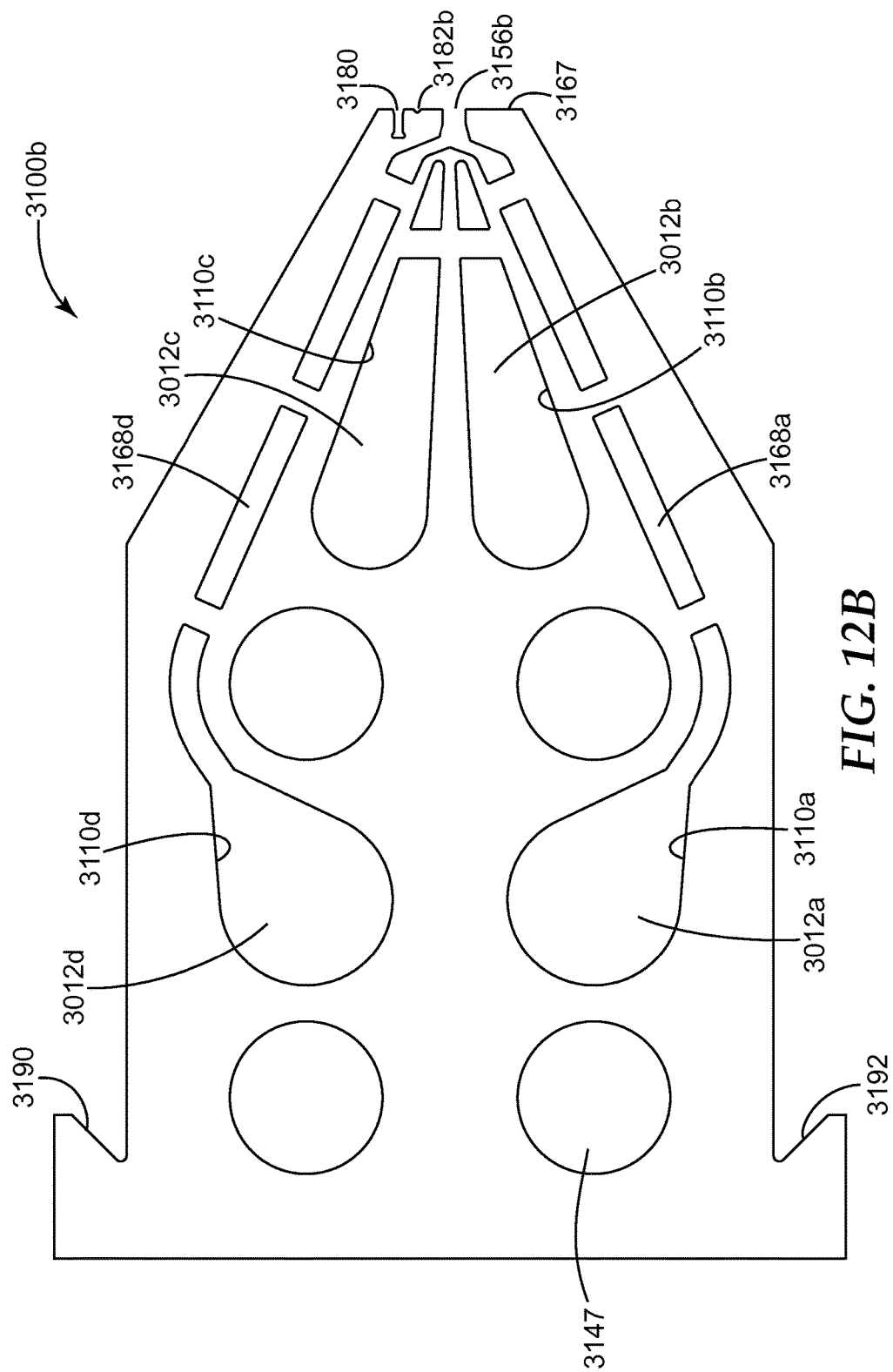
FIG. 12B is a plan view of an embodiment of a shim suited to form a sequence of shims useful for making a polymeric netting as shown, for example, in FIG. 4.

Referring now to FIG. 12B, a plan view of shim 3100b is illustrated. Shim 3100b is very similar to shim 3100a except for the positions of dispensing openings 3156b and identification notch 3182b.

Figure 13:
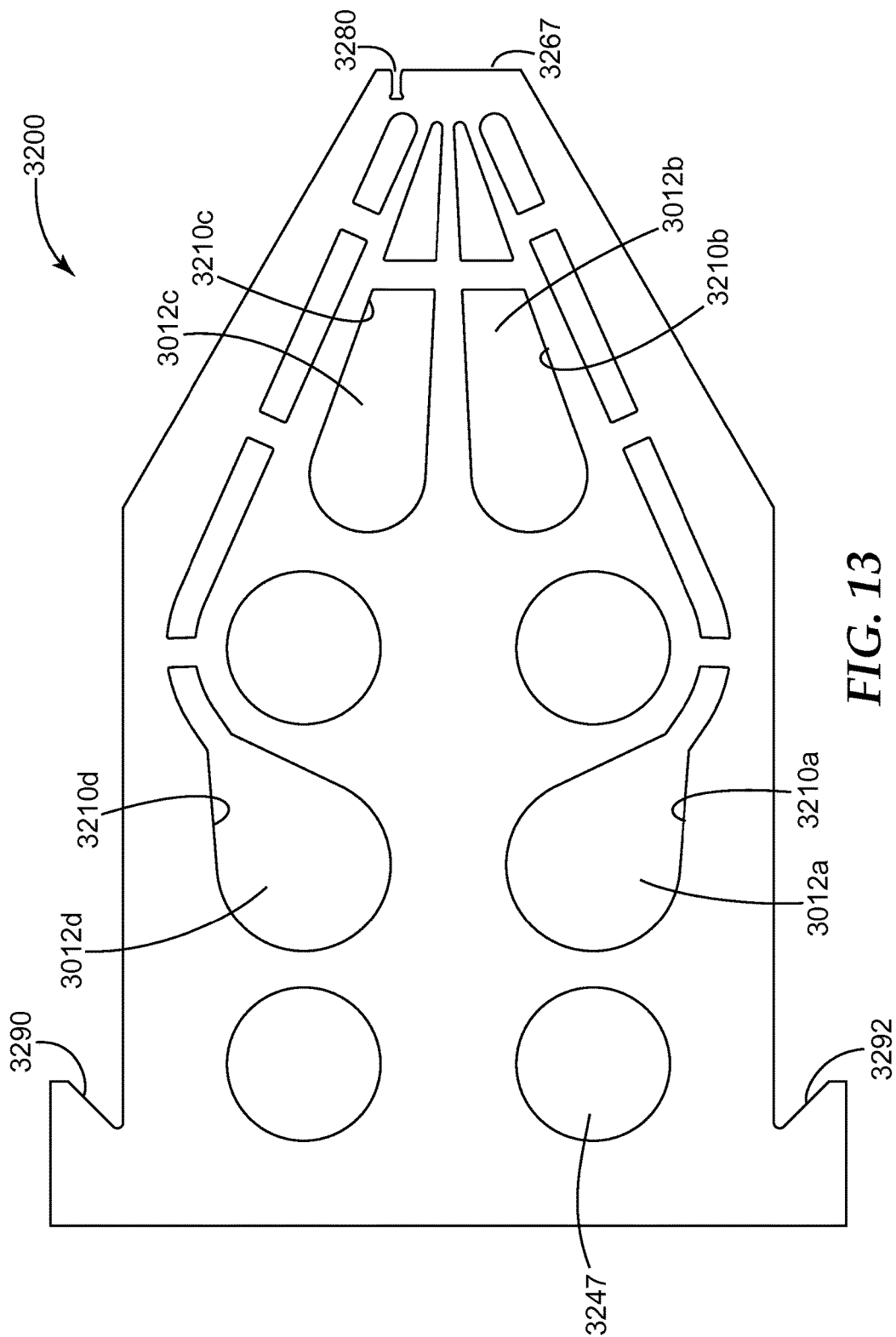
FIG. 13 is a plan view of another embodiment of a shim suited to form a sequence of shims useful for making a polymeric netting as shown, for example, in FIG. 4.

Referring now to FIG. 13, a plan view of shim 3200 is illustrated. Shim 3200 has first aperture, 3210a, second aperture 3210b, third aperture 3210c, and fourth aperture 3210d. When shim 3200 is assembled with others as shown in FIGS. 15A and 15B, first aperture 3210a will help define first cavity 3012a, second aperture 3210b will help define second cavity 3012b, third aperture 3210c will help define third cavity 3012c, and fourth aperture 3210d with help define fourth cavity 3012d. Analogous to shim 3100, shim 3200 has dispensing surface 3267, and in this particular embodiment, dispensing surface 3267 has indexing groove 3280. Also analogous to shim 3100, shim 3200 has shoulders 3290 and 3292 and holes 3247. There is no passage from any of the cavities to dispensing surface 3267 since this shim creates a non-dispensing area along the width of the die. Referring again to FIG. 4, shim(s) 3200 are useful for separating shims 3100 producing polymeric ribbons 81 from shims 3300 producing polymeric strands 83.

Figure 14:
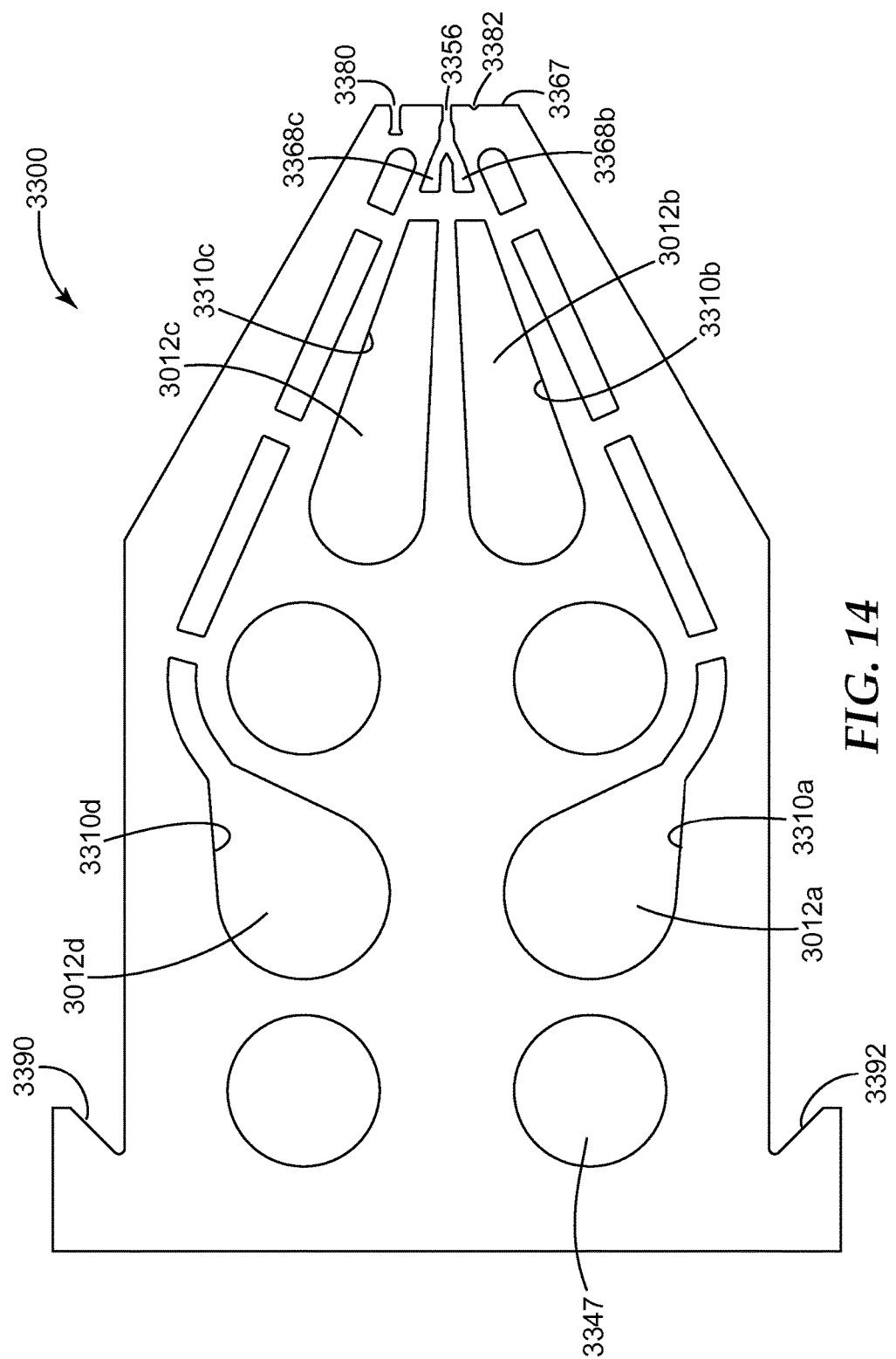
FIG. 14 is a plan view of yet another embodiment of a shim suited to form a sequence of shims useful for a polymeric netting as shown, for example, in FIG. 4.

Referring now to FIG. 14, a plan view of shim 3300 is illustrated. Shim 3300 has first aperture 3310a, second aperture 3310b, third aperture 3310c, and fourth aperture 3310d. When shim 3300 is assembled with others as shown in FIGS. 15A and 15B, first aperture 3310a will help define first cavity 3012a, second aperture 3310b will help define second cavity 3012b, third aperture 3310c will help define third cavity 3012c, and fourth aperture 3310d with help define fourth cavity 3012d. Analogous to shim 3100, shim 3300 has dispensing surface 3367, and in this particular embodiment, dispensing surface 3367 has indexing groove 3380 and identification notch 3382. Also analogous to shim 3100, shim 3300 has shoulders 3390 and 3392 and holes 3347. Shim 3300 has dispensing opening 3356 in dispensing surface 3367. It might appear that there are no paths from apertures 3310b and 3310c to dispensing opening 3356, via, for example, passageway 3368b and 3368c, respectively, but the flows have routes in the perpendicular-to-the-plane-of-the-shim dimension when the sequence of FIG. 15A, for example, is completely assembled.

Referring now to FIGS. 15A and 15B, a perspective assembly drawing of a sequence of shims, collectively 3000, employing the shims of FIGS. 12A, 12B, 13, and 14 so as to produce polymeric ribbons 81 and polymeric strands 83 polymeric netting 80 shown in FIG. 4 is shown. More particularly, proceeding from left to right in FIG. 15B, sequence 3000 includes four instances of shims 3300 that can extrude polymeric strands 83, two instances of shims 3100a that can extrude polymeric ribbons 81, four instances of shim 3200, four instances of shim 3300 that can extrude polymeric strands 83, four instances of shim 3200, two instances of shim 3100b that can extrude polymeric ribbons 91, and four instances of shims 3200. Dispensing orifices 3001, 3011, and 3003 are separated by shims 3200, which causes the separation of polymeric ribbons 81, 91 from polymeric strands 83 in the polymeric netting 80. The first dispensing orifices 3001 each have a height h3001 to width w3001 aspect ratio of at least three to one (in some embodiments, at least 5:1, 8:1, 10:1, 11:1, 15:1, 20:1, 30:1, or 40:1). The third dispensing orifices 3001 each have a height h3011 to width w3011 aspect ratio of at least three to one (in some embodiments, at least 5:1, 8:1, 10:1, 11:1, 15:1, 20:1, 30:1, or 40:1). As in the embodiment shown in FIG. 9B, the height h3001 of the first dispensing orifices 3001 and height h3011 of the third dispensing orifices 3011 is at least 2, 2.5, 3, 5, 10, or 20 times larger than the height h3003 of the second dispensing orifices. In this embodiment, at least the first and third dispensing orifices 3001, 3011 are defined by an array of first vestibules, and the die includes a first fluid passageway 3068a between the first cavity 3012a and one of the first vestibules, and a fourth passageway 3068d extending from the fourth cavity 3012d to the same vestibule, such that the area where the first fluid passageway 3068a enters the first vestibules is below the area where the fourth fluid passageway 3068d enters the first vestibules. The extrusion die also includes fluid passageways extending from one of the cavities within the die to the second dispensing orifices. In the illustrated embodiment, the second dispensing orifices 3003 are defined by an array of second vestibules, and the die includes a second fluid passageway 3068b between the second cavity 3012b and one of the second vestibules, and a fifth passageway 3068c extending from a third cavity 3012c to the same vestibule, such that the area where the second fluid passageway 3068b enters the second vestibules is below the area where the fifth fluid passageway 3068c enters the second vestibules.

In other embodiments in which the first edges of the polymeric ribbons comprise a different composition than the second edges of the polymeric ribbons, the polymeric netting can be surface treated with a surfactant (e.g., in an amount between about 0.05 and 0.5 weight percent). If a surfactant is used, it can be an internal additive in a polymeric composition that migrates to the surface, or a surfactant can be applied to the web by any conventional means (e.g., spraying, printing, dipping, or brush coating). Polymer compositions (e.g., those providing second portions 91b and 93b shown in FIG. 4) may be selected to be hydrophilic or to include a surfactant, or a surfactant can be applied to a major surface of the polymeric netting to impart a desired level of wettability and hydrophilicity to at least a portion of the polymeric netting for certain applications.

In any of the aforementioned embodiments of the polymeric netting according to and/or made from the method according to the present disclosure, the distance between bonds can be in a range from 0.5 mm to 20 mm (in some embodiments, in a range from 0.5 mm to 10 mm). Also, in any of the aforementioned embodiments, the polymeric netting according to the present disclosure or made from the method disclosed herein can have a basis weight in a range from 5 g/m$^2$ to 750 g/m$^2$ (in some embodiments, 5 g/m$^2$ to 400 g/m$^2$ or 10 g/m$^2$ to 200 g/m$^2$). In some embodiments, the polymeric netting disclosed herein in any of the aforementioned embodiments has a thickness up to 4 mm (in some embodiments, up to 3.5 mm, 3 mm, 2 mm, 1 mm, 0.75 mm, or less than 0.75 mm) in some embodiments, in a range from 10 micrometers to 4 mm, 10 micrometers to 3.5 mm, 10 micrometers to 3 mm, 10 micrometers to 2 mm, 10 micrometers to 1 mm, 10 micrometers to 750 micrometers, 10 micrometers to less than 750 micrometers, 10 micrometers to 749 micrometers, 10 micrometers to 700 micrometers, or 10 micrometers to 650 micrometers.

Figure 16:
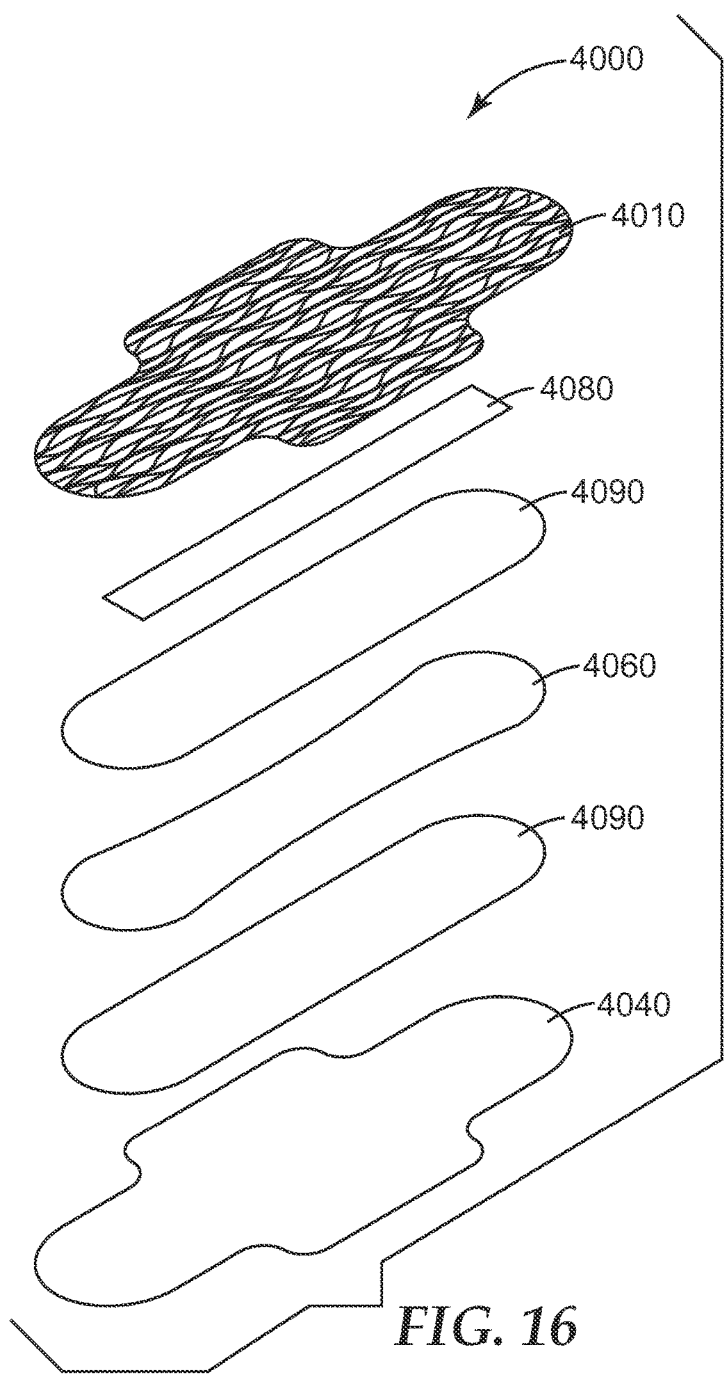
FIG. 16 is a schematic exploded view of an example of an absorbent article according to the present disclosure.

The polymeric netting according to and/or made according to the present disclosure is useful, for example, in absorbent articles. Accordingly, the present disclosure provides an absorbent article including a polymeric netting according to the present disclosure. Personal care absorbent articles, such as diapers, training pants, adult incontinence garments, and feminine hygiene pads (e.g., sanitary napkins and pantyliners) and wound care absorbent articles (e.g., wound dressings and bandages) are often constructed using a skin-facing fluid pervious topsheet, a garment-facing fluid impervious backsheet, and an absorbent core positioned therebetween. An exploded schematic view of an example of an embodiment of an absorbent article 4000 according to the present disclosure is shown in FIG. 16. In absorbent articles according to the present disclosure, the absorbent core 4060 is typically interposed between the polymeric netting and the backsheet 4040. The polymeric netting can be useful, for example as at least one of a topsheet 4010 or acquisition/distribution layer 4080. In the illustrated embodiment, the polymeric netting forms topsheet 4010. When used as an acquisition/distribution layer 4080, the polymeric netting may also be located between the absorbent core 4060 and the backsheet 4040 or within the absorbent core 4060 (e.g., between two tissue sheets 4090).

Polymeric netting according to the present disclosure advantageously can be used as a topsheet in an absorbent article. Referring to FIG. 16, the topsheet 4010 is the layer against the user's skin and so the first layer in contact with liquid or other exudate from the user. The topsheet desirably serves several purposes including keeping the absorbent material contained within the article, allowing fluids to rapidly pass through to the absorbent core, providing a skin friendly, comfortable contact surface for the skin contacted by the article, keeping the skin clean and dry, and helping to prevent absorbed fluid from coming into contact with the skin.

In any of the embodiments described above, such as those shown in FIGS. 1 to 4, the Examples below indicate that in some embodiments, the polymeric netting can have at least one of the following features: capable of rapid fluid uptake, directs the fluid in the machine direction of the material, offers a high degree of resistance to rewet, presents a dry to the touch skin facing surface after exposure to fluids, and due to the flexibility of the ribbon like element provides a cleansing action to the skin, driven by natural body motions, resulting in cleaner and drier skin for the wearer of an absorbent hygiene article utilizing this new topsheet material.

In an absorbent article according to the present disclosure, the backsheet (e.g., 4040 shown in FIG. 16), sometimes referred to as the outer cover, is the farthest layer from the user. The backsheet is typically formed of a thin thermoplastic film (e.g., polyethylene film) which is substantially impermeable to liquid. The backsheet functions to prevent body exudates absorbed by the absorbent core from wetting or soiling the wearer's clothing, bedding, or other materials contacting the absorbent article. A variety of materials for the backsheet may be suitable in an absorbent article according to the present disclosure. For example, the backsheet may comprise a polyethylene film (e.g., having an initial thickness of about 0.5 mil (0.012 millimeter) to about 5.0 mil (0.12 millimeter)), a woven or nonwoven fibrous web constructed or treated to impart the desired level of liquid impermeability, a laminate of a woven or nonwoven fabric and thermoplastic film, or a vapor or gas permeable microporous "breathable" material that is substantially impermeable to liquid. Films useful as backsheets, for example, may be embossed and/or matte finished to provide a more aesthetically pleasing appearance.

In an absorbent article according to the present disclosure, the absorbent core (e.g., 4060 as shown in FIG. 16) typically includes a natural, synthetic, or modified natural organic polymer that can absorb and hold liquids (e.g., aqueous liquids). In some embodiments, the polymer is crosslinked. The term "crosslinked" refers to any means for effectively rendering normally water-soluble materials substantially water insoluble but swellable. Such absorbent materials are usually designed to quickly absorb liquids and hold them, usually without release. The size and the absorbent capacity of the absorbent core are typically compatible with the size of the intended wearer and the liquid loading imparted by the intended use of the absorbent article. Various absorbents may be useful, for example, a cellulosic material (e.g., wood pulp fluff), hydrophilic, synthetic meltblown fibers, superabsorbent polymer (SAP), an acrylic foam absorbent (e.g., foams described in U.S. Pat. No. 5,817,704 (Shiveley et al.) and the references cited therein, prepared, for example, by polymerization of high internal phase emulsions), and any combination thereof. Absorbent materials may be zoned and their compositions chosen to move liquids away from the original location of the incoming insult to more remote storage locations. In some embodiments, the absorbent core can include one or more substantially hydrophilic tissue sheets 4090 to help maintain the integrity, for example, of the structure of the absorbent core. The tissue sheet(s), which may be one tissue sheet wrapped around to provide two major facing surfaces of the absorbent core, can include absorbent cellulosic material (e.g., creped wadding or a high wet-strength tissue). In some embodiments, the tissue sheet can be configured to rapidly distribute liquid over the absorbent core. In these embodiments, the tissue sheet may be considered a distribution layer, which moves fluid from the point of initial deposition to the location where storage is desired.

Some absorbent articles include an acquisition layer 4080, which can be useful for quickly accepting an incoming insult and either absorb, hold, channel, or otherwise manage the liquid so that it does not leak outside the article. The acquisition layer may also be referred to, for example, as a surge layer, intake layer, transfer layer, or transport layer. An acquisition layer is generally capable of handling an incoming insult of between about 60 and 100 milliliters (mL) at an insult volumetric flow rate of from about 5 to 20 mL/second, for infants, for example. An acquisition layer is generally subjacent the topsheet at the surface opposite the user's skin. Various woven and nonwoven webs and foams can be used to construct an acquisition layer. Acquisition layers may be composed of a substantially hydrophobic material, and the hydrophobic material may optionally be treated with a surfactant or otherwise processed to impart a desired level of wettability and hydrophilicity. In some embodiments, acquisition layer 4080 can have a generally uniform thickness and cross-sectional area. The polymeric netting according to the present disclosure may be useful as an acquisition layer in combination with a conventional topsheet (e.g., a nonwoven or an apertured film as described below) as a topsheet in combination with a conventional acquisition layer, or in some embodiments as a replacement for both a conventional topsheet and acquisition layer. In other words, when the polymeric netting according to the present disclosure is used as a topsheet, the need for the acquisition layer may be eliminated.

Suitable conventional attachment techniques may be useful for assembling an absorbent article according to the present disclosure. When used as a topsheet 4010, the polymeric netting according to the present disclosure may be attached to the absorbent core 4060 or the acquisition layer 4080 (if used) using at least one of adhesive bonding (e.g., using water-based, solvent-based, or thermally activated adhesives), thermal bonding, ultrasonic bonding, needling, or pin aperturing. When used as an acquisition layer 4080, the polymeric netting according to the present disclosure can be attached to both the conventional topsheet and the absorbent core 4060 also using any one of these methods. If adhesive bonding is used, the amount of adhesive add-on should be sufficient to provide the desired level(s) of bonding, without excessively restricting the flow of liquid into the absorbent core 4060.

When used as a topsheet in an absorbent article, the polymeric netting can overcome disadvantages of conventional topsheet materials. For diapers, incontinence articles, and feminine hygiene pads the conventional types of topsheet, generally fall into two main groups: nonwovens and apertured films. Nonwovens have the advantage of being soft and cloth-like in feel. Nonwovens can be made hydrophilic (e.g., by treating with surfactant) to allow rapid fluid transport through the nonwoven to the absorbent. Such hydrophilic materials tend to cause user to feel wetness possibly due to small amounts of fluid being retained in the nonwoven. Retained fluid in the nonwoven also makes the fluid more visible, which is undesirable. Some hydrophilic nonwovens also have a tendency to direct fluids toward the lateral edges of the pad, potentially contributing to side leakage. To achieve the goals of softness and dry feel in nonwoven topsheets, sometimes the nonwoven is made of hydrophobic fibers. The use of hydrophobic fibers typically results in improved dry feel, but hydrophobic nonwovens may not allow rapid fluid transport into the pad. Sometimes hydrophobic nonwovens can cause fluid to pool on the surface of the pad, which can also result in leakage. An advantage of using apertured films as topsheets for absorbent articles is that they provide a relatively clean and dry surface as exudates passes through the film layer and into the interior of the pad. A drawback of such film-based topsheets is that they do not provide the degree of softness and comfort that a nonwoven topsheet provides.

In use as an absorbent article, the structure of the polymeric netting according to the present disclosure, with its polymeric ribbons that are vertically offset and, in some embodiment, separated from each other by polymeric strands that are significantly shorter, creates a plurality of air flow channels along the lengths of the polymeric ribbons and that allow air to circulate between the absorbent and the skin of the wearer even while the second edges of the polymeric ribbons, distal from the absorbent, are in contact with the skin of the wearer. These channels, which are absent from conventional topsheet materials, can provide a feeling of dryness and comfort. The second edges of the second polymeric ribbons, which extend above the height of the first polymeric ribbons and polymeric strands, are free to flex and bend in response to any lateral forces exerted on them (e.g., through movement of the user). The flexibility of the polymeric ribbons adds to a feeling of softness against the user's skin. It is also believed that the ability of the polymeric ribbons to bend allows them to provide a cleansing action when the absorbent article is shifted slightly in its position relative to the user's skin. When the second edges of the polymeric ribbons contact the user's skin, small movements of the user (e.g., walking) can cause the polymeric ribbons to bend which may allow the polymeric ribbons to come into contact with a drop of liquid on a user's skin and draw it down to contact the absorbent. In this way, the polymeric ribbons serve as miniature squeegees for removing liquid from the skin.

Also, as shown in Table 1 in the Examples below, the structure of the polymeric netting according to the present disclosure, with its polymeric ribbons offset from each other allows fluid to be distributed in an absorbent article in the longitudinal direction to a much greater extent than in a conventional pad. Better distribution of fluid can prevent leakage in an absorbent article.

With the polymeric nettings according to the present disclosure and/or made according to a method disclosed herein, it may be useful to have the polymeric ribbons spread apart from one another to a greater extent in one portion of the absorbent article than in the other (e.g., using the methods described above.) Attaching the spread polymeric netting to the absorbent or another layer of the article is useful for holding the web in this spread open condition. Spreading in certain locations allows the performance of the polymeric netting to be tailored to provide, for example, a different uptake rate and other performance characteristics near the lateral centerline of the article than near the lateral edges of the article. However, in some embodiments it may be desired to spread the web in the cross direction uniformly across the entire width of the polymeric netting.

The polymeric compositions selected for the polymeric ribbons and polymeric strands when the polymeric netting is used in an absorbent article may be hydrophobic or hydrophilic as desired. Additional material modifiers (e.g. surfactants) can be added to at least one of the polymeric ribbons or polymeric strands to change their hydrophilicity or tailor how a liquid interacts with the polymeric netting. For example, the polymeric ribbons may be made relatively hydrophilic for quicker fluid penetration through the polymeric netting while the polymeric strands may be made hydrophobic to minimize rewet. Referring again to FIG. 1, if polymeric netting 10 is positioned on an absorbent such that polymeric ribbons 1 are extending away from the absorbent and polymeric ribbons 11 are in contact with the absorbent, polymeric ribbons 1 may be made hydrophilic to draw fluid into the absorbent, and polymeric ribbons 11 may be made hydrophobic to minimize rewet. In FIG. 4, if polymeric netting 80 is positioned on an absorbent such that the second portions 91b of the polymeric ribbons 91 are in contact with the absorbent, the first portions 81a of at least the polymeric ribbons may be made hydrophilic to draw fluid into the absorbent, and at least the second portions 91b of the polymeric ribbons or polymeric strands may be made hydrophobic to minimize rewet. The portions 81a, 81b, 91a, and 91b may be made of decreasingly hydrophilic polymeric compositions to provide a type of gradient of hydrophilicity in the netting. In some embodiments, it may also be desirable to have the opposite pattern of hydrophilicity, for example, in which the polymeric ribbons or portions thereof that extend away from the absorbent and toward the skin are more hydrophobic than the polymeric ribbons, strands, or portions thereof positioned on the absorbent. These gradients of hydrophilicity and hydrophobicity may also be useful in other applications for the polymeric nettings described below, for example, that do not include an absorbent.

Polymeric netting according to the present disclosure may also be useful, for example, as part of a cleaning device, such as a wipe or a sponge. The cleansing action provided by the polymeric ribbons described above in connection with absorbent articles may also make polymeric nettings disclosed herein useful for cleaning hard surfaces. Many times cleaning sheets are too flat over the surface being cleaned and therefore only the leading edge of the cleaning sheet will load with material. A variety of techniques have been disclosed to raise portions of the cleaning sheet or to have recessed portions of the cleaning sheet to more effectively get dirt, dust and debris to capture and retain across the working surface; see, e.g., U.S. Pat. No. 7,757,334 (Patel et al.) and U.S. Pat. Appl. Pub. Nos. 2007-0136967 (Tochacek et al.) and 2009-0144923 (Tuman et al.). It is believed that the first edges of the polymeric ribbons can be useful at the working surface of a cleaning wipe or sponge to scoop up debris during use, and the channels in the polymeric netting structure can help deliver the debris to a retaining surface within the wipe or sponge.

Figure 17:
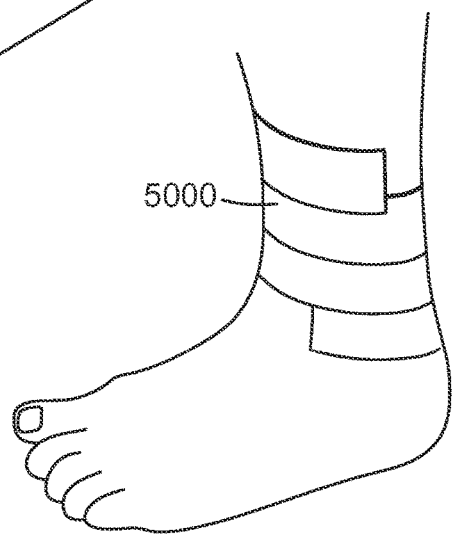
FIG. 17 is a perspective view of a foot showing an embodiment of the polymeric netting according to the present disclosure used as a wrap.

Polymeric nettings according to the present disclosure are also useful, for example, as elastic wraps. Such wraps can be useful, for example, in medical and athletic applications. For example, a polymeric netting according to the present disclosure can be useful in compression therapy, in which the application of external pressure to vascular elements increases interstitial pressure. The resulting improvement in venous return and alleviation of various symptoms (e.g., venous ulcerations and edema) makes compression therapy a useful treatment in venous and lymphatic disease, for example. Polymeric netting according to the present disclosure in use as a wrap 5000 is illustrated in FIG. 17. The net structure of wrap 5000 allows for two-way stretching and high breathability. The wrap may be secured using any conventional fastener (e.g., adhesive or mechanical fasteners).

Polymeric nettings useful as wraps may have any of the configurations shown in FIGS. 1 to 4. In use as a wrap, the portions of the polymeric ribbons in the polymeric nettings disclosed herein in any of their embodiments that are in contact with the wearer's skin are free to flex and bend in response to any lateral forces exerted on the tops of these ribbons. In other words, the polymeric ribbons ends of the polymeric ribbons are free to bend over the polymeric strands. Because of this movement, it is believed that micromuscular movements during wear are more comfortable than with the elastic wraps that do not have this deflection behavior. The deflection of the polymeric ribbons makes the compression wrap feel soft and spongy to the touch.

Furthermore, when the polymeric nettings disclosed herein in any of their embodiments are used as wraps, the polymeric ribbons on one major surface of the netting may be interleaved with polymeric ribbons on the opposite surface of the polymeric netting when the polymeric netting is in a wrapped configuration. Depending on the materials that are used in the netting, these interleaved ribbons may exhibit adhesion to each other and may assist with the fastening of the wrap around the wearer.

Figure 18B:
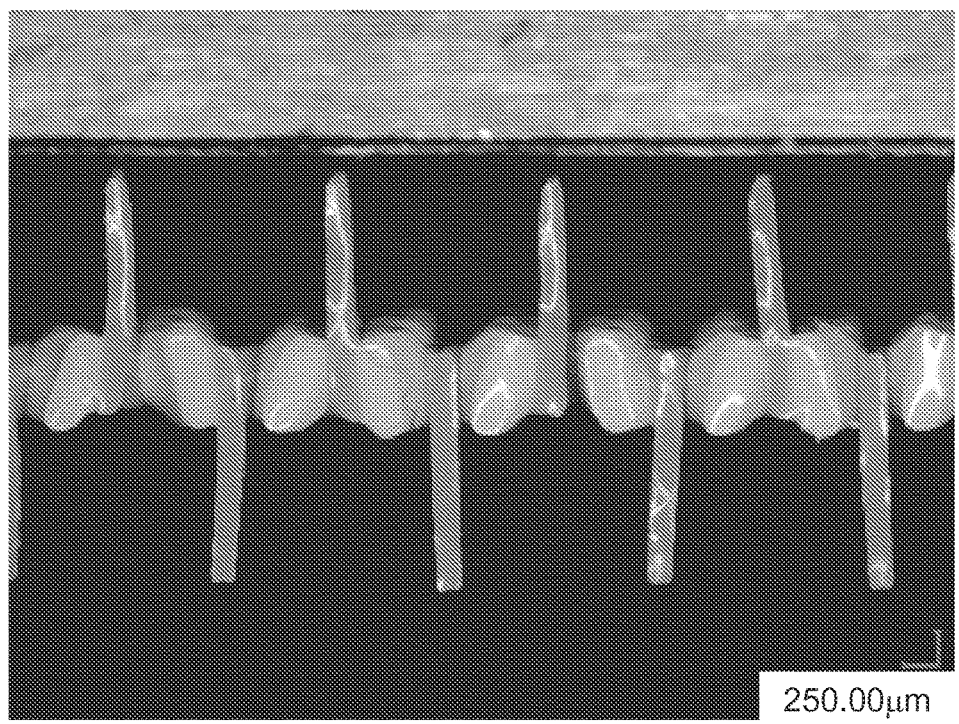

In embodiments in which the polymeric ribbons and polymeric strands are different colors, polymeric nettings useful as wraps, for example, can have unique aesthetic appeal. Using different colors in the polymeric ribbons from the polymeric strands can result in an iridescence in which the color of the wrap appears to be different depending upon the angle of viewing. Thus, in some embodiments, polymeric nettings according to the present disclosure useful as wraps have polymeric ribbons that are a different color from the polymeric strands. Furthermore, different polymeric ribbons 1 and 11, 21 and 31, 41 and 51, 61 and 71, or 81 and 91, shown in FIGS. 1 to 4, for example, may be different colors. For example, three different colors of polymer may be used to make second polymeric ribbons 1, polymeric strands 3, and first polymeric ribbons 11, shown in FIG. 1. When the polymeric ribbons 1 are viewed at an angle, the polymeric netting 10 may appear to be predominantly the color of ribbons 1. When the polymeric ribbons 11 are viewed at an angle, the polymeric netting 10 may appear to be predominantly the color of ribbons 11, and when the polymeric netting is viewed from the top or the edge (e.g., as shown in FIGS. 18A and 18B) all three colors may be visible.

In some applications, the polymeric netting according to the present disclosure and/or made according to a method disclosed herein can be used, for example, to provide spacers between filtering layers for filtration packs and/or to provide rigidity and support for filtration media. In some embodiments, several layers of the polymeric netting are used, where each layer is positioned to provide optimal filtering. Also, in some embodiments, the elastic feature of some polymeric nettings disclosed herein can accommodate expansion of the filter as the filter fills up.

In addition to the applications described above, polymeric nettings according to the present disclosure and/or made according to the method disclosed herein may be useful in a variety of other applications, including as a surface layer for surgical drapes and gowns, cast padding, tapes (including for medical applications), pest control articles (e.g., mosquito nettings), geotextile applications (e.g., erosion control textiles), water/vapor management in clothing, reinforcement for nonwoven articles (e.g., paper towels), self-bulking articles (e.g., for packaging) where the polymeric netting thickness is increased by stretching polymeric nettings with polymeric ribbons and polymeric strands having very different moduli or elasticities, floor coverings (e.g., rugs and temporary mats), grip supports (e.g., for tools and athletic articles), and pattern-coated adhesives.

In some embodiments, the polymeric netting according to and/or made according to the present disclosure is joined to a carrier for ease of handling or for making a laminate for a selected application. The polymeric netting may be joined to a carrier, for example, by lamination (e.g., extrusion lamination), adhesives (e.g., pressure sensitive adhesives), or other bonding methods (e.g., ultrasonic bonding, compression bonding, or surface bonding).

The carrier may be continuous (i.e., without any through-penetrating holes) or discontinuous (e.g. comprising through-penetrating perforations or pores). The carrier may comprise a variety of suitable materials including woven webs, non-woven webs (e.g., spunbond webs, spunlaced webs, airlaid webs, meltblown web, and bonded carded webs), textiles, plastic films (e.g., single- or multilayered films, coextruded films, laterally laminated films, or films comprising foam layers), and combinations thereof. In some embodiments, the carrier is a fibrous material (e.g., a woven, nonwoven, or knit material). Examples of materials for forming thermoplastic films or thermoplastic fibers for a fibrous carrier include polyolefins (e.g., polyethylene, polypropylene, polybutylene, ethylene copolymers, propylene copolymers, butylene copolymers, and copolymers and blends of these polymers), polyesters, and polyamides. The fibers may also be multi-component fibers, for example, having a core of one thermoplastic material and a sheath of another thermoplastic material. In some embodiments, the carrier comprises multiple layers of nonwoven materials with, for example, at least one layer of a meltblown nonwoven and at least one layer of a spunbonded nonwoven, or any other suitable combination of nonwoven materials. For example, the carrier may be a spunbond-meltbond-spunbond, spunbond-spunbond, or spunbond-spunbond-spunbond multilayer material. Or, the carrier may be a composite web comprising a nonwoven layer and a dense film layer. Useful carriers may have any suitable basis weight or thickness that is desired for a particular application. For a fibrous carrier, the basis weight may range, e.g., from at least about 5, 8, 10, 20, 30, or 40 grams per square meter, up to about 400, 200, or 100 grams per square meter. The carrier may be up to about 5 mm, about 2 mm, or about 1 mm in thickness and/or at least about 0.1, about 0.2, or about 0.5 mm in thickness.

In some embodiments where the polymeric netting is made from a thermoplastic, the thermoplastic can be joined to a fibrous web carrier using surface bonding or loft-retaining bonding techniques. The term "surface-bonded" when referring to the bonding of fibrous materials means that parts of fiber surfaces of at least portions of fibers are melt-bonded to at least a portion of the polymeric netting, in such a manner as to substantially preserve the original (pre-bonded) shape of the polymeric netting, and to substantially preserve at least some portions of the polymeric netting in an exposed condition, in the surface-bonded area. Quantitatively, surface-bonded fibers may be distinguished from embedded fibers in that at least about 65% of the surface area of the surface-bonded fiber is visible above the polymeric netting in the bonded portion of the fiber. Inspection from more than one angle may be necessary to visualize the entirety of the surface area of the fiber. The term "loft-retaining bond" when referring to the bonding of fibrous materials means a bonded fibrous material comprises a loft that is at least 80% of the loft exhibited by the material prior to, or in the absence of, the bonding process. The loft of a fibrous material as used herein is the ratio of the total volume occupied by the web (including fibers as well as interstitial spaces of the material that are not occupied by fibers) to the volume occupied by the material of the fibers alone. If only a portion of a fibrous web has the polymeric netting bonded thereto, the retained loft can be easily ascertained by comparing the loft of the fibrous web in the bonded area to that of the web in an unbonded area. It may be convenient in some circumstances to compare the loft of the bonded web to that of a sample of the same web before being bonded, for example, if the entirety of fibrous web has the polymeric netting bonded thereto. In some of these embodiments, the joining comprises impinging heated gaseous fluid (e.g., ambient air, dehumidified air, nitrogen, an inert gas, or other gas mixture) onto a first surface of the fibrous web carrier while it is moving; impinging heated fluid onto a major surface of the polymeric netting while the continuous web is moving; and contacting the first surface of the fibrous web with the polymeric netting so that the first surface of the fibrous web is melt-bonded (e.g., surface-bonded or bonded with a loft-retaining bond) to the polymeric netting. Impinging heated gaseous fluid onto the first surface of the fibrous web and impinging heated gaseous fluid on a major surface of the polymeric netting may be carried out sequentially or simultaneously. Further methods and apparatus for joining a continuous web to a fibrous carrier web using heated gaseous fluid may be found in U.S. Pat. Appl. Pub. Nos. 2011/0151171 (Biegler et al.) and 2011/0147475 (Biegler et al.).

In some embodiments wherein the polymeric netting is joined to a carrier, one or more zones of the carrier may comprise one or more elastically extensible materials extending in at least one direction when a force is applied and returning to approximately their original dimension after the force is removed. In some embodiments, at least the portion of the carrier joined to the multiple strands of the backing or loop material is not stretchable. In some embodiments, the portion of carrier joined to the multiple strands will have up to a 10 (in some embodiments, up to 9, 8, 7, 6, or 5) percent elongation in the CD. In some embodiments, such constructions may be subjected to mechanical activation (e.g., ring rolling) to render them elastomeric. In some embodiments, the carrier may be extensible but nonelastic. In other words, the carrier may have an elongation of at least 5, 10, 15, 20, 25, 30, 40, or 50 percent but substantially no recovery from the elongation (e.g., up to 10 or 5 percent recovery). Suitable extensible carriers may include nonwovens (e.g., spunbond, spunbond meltblown spunbond, or carded nonwovens). In some embodiments, the nonwoven may be a high elongation carded nonwoven (e.g., HEC). In some embodiments, the carrier is not pleated.

Some Embodiments of the Disclosure

In a first embodiment, the present disclosure provides a polymeric netting comprising first and second polymeric ribbons and polymeric strands, each of the first and second polymeric ribbons and polymeric strands having a length and width, wherein the length is the longest dimension and the width is the shortest dimension, wherein the first and second polymeric ribbons each independently have a height-to-width aspect ratio of at least three to one, a major surface that is intermittently bonded multiple times to a polymeric strand at spaced-apart bonding sites, with a center line bisecting the major surface and first and second edges symmetrically disposed on opposite sides of the center line, wherein the polymeric netting has first and second opposing major surfaces transverse to the major surfaces of the first and second polymeric ribbons, wherein the first major surface of the polymeric netting comprises the first edges of the first polymeric ribbons, wherein the second major surface comprises the second edges of the second polymeric ribbons, wherein the first polymeric ribbons do not extend to the second major surface, and wherein the second polymeric ribbons do not extend to the first major surface.

In a second embodiment, the present disclosure provides the polymeric netting of the first embodiment, wherein the height of at least one of the first and second polymeric ribbons is greater than the height of the polymeric strands for at least a portion of the polymeric netting.

In a third embodiment, the present disclosure provides the polymeric netting of the first or second embodiment, wherein the height of at least one of the first and second polymeric ribbons is independently at least twice the height of the polymeric strands for at least a portion of the polymeric netting.

In a fourth embodiment, the present disclosure provides the polymeric netting of any one of the first to third embodiments, wherein neither the first nor second major surface of the polymeric netting comprises a portion of the polymeric strands.

In a fifth embodiment, the present disclosure provides the polymeric netting any one of the first to fourth embodiments, wherein the major surface of the first polymeric ribbons is bonded to its polymeric strand at a location closer to the second edge than the first edge, and the major surface of the second polymeric ribbons is bonded to its polymeric strand at a location closer to the first edge than the second edge.

In a sixth embodiment, the present disclosure provides the polymeric netting any one of the first to fifth embodiments, wherein for at least one of the first or second polymeric ribbons the first edges comprise a different polymeric composition than the second edges in at least a portion of the polymeric netting.

In a seventh embodiment, the present disclosure provides the polymeric netting of any one of the first to sixth embodiments, wherein polymeric strands alternate with at least one of the first or second polymeric ribbons in at least a portion of the polymeric netting.

In an eighth embodiment, the present disclosure provides the polymeric netting of any one of the first to seventh embodiments, wherein one first polymeric ribbon is disposed between any two adjacent second polymeric ribbons, and wherein one second polymeric ribbon is disposed between any two adjacent first polymeric ribbons.

In a ninth embodiment, the present disclosure provides the polymeric netting of any one of the first to eighth embodiments, wherein the polymeric strands do not intersect the first or second polymeric ribbons.

In a tenth embodiment, the present disclosure provides the polymeric netting of any one of the first to ninth embodiments, wherein the height-to-width aspect ratio of at least one of the first polymeric ribbons or second polymeric ribbons is independently at least 5 to 1.

In an eleventh embodiment, the present disclosure provides the polymeric netting of any one of the first to tenth embodiments, wherein the height of at least one of the first polymeric ribbons or the second polymeric ribbons is independently greater than 750 micrometers.

In a twelfth embodiment, the present disclosure provides the polymeric netting of any one of the first to tenth embodiments, wherein the height of at least one of the first polymeric ribbons or the second polymeric ribbons is independently less than 750 micrometers.

In a thirteenth embodiment, the present disclosure provides the polymeric netting of any one of the first to twelfth embodiments, wherein at least some of the first and second polymeric ribbons have a different color than at least some of the polymeric strands.

In a fourteenth embodiment, the present disclosure provides the polymeric netting of any one of the first to twelfth embodiments, wherein at least some of the first and second polymeric ribbons have a different polymeric composition than at least some of the polymeric strands.

In a fifteenth embodiment, the present disclosure provides the polymeric netting of any one of the first to fourteenth embodiments, wherein at least some of the first polymeric ribbons have a different color than at least some of the second polymeric ribbons.

In a sixteenth embodiment, the present disclosure provides the polymeric netting of any one of the first to fifteenth embodiments, wherein at least some of the first polymeric ribbons have a different polymeric composition than at least some of the second polymeric ribbons.

In a seventeenth embodiment, the present disclosure provides the polymeric netting of any one of the first to sixteenth embodiments, wherein the first polymeric ribbons are elastic, the second polymeric ribbons are elastic, the polymeric strands are elastic, or any combination thereof.

In an eighteenth embodiment, the present disclosure provides the polymeric netting of any one of the first to seventeenth embodiments, wherein at least one of the first or second polymeric ribbons are substantially straight.

In a nineteenth embodiment, the present disclosure provides the polymeric netting of any one of the first to eighteenth embodiments, wherein at least one of the first or second polymeric ribbons do not have a uniform height.

In a twentieth embodiment, the present disclosure provides the polymeric netting of any one of the first to nineteenth embodiments, wherein in at least a portion of the polymeric netting, the major surface of at least one of the first or second polymeric ribbons is bonded to more than one polymeric strand.

In a twenty-first embodiment, the present disclosure provides the polymeric netting of any one of the first to nineteenth embodiments, wherein in at least a portion of the polymeric netting, the major surface of at least one of the first or second polymeric ribbons is bonded to only one polymeric strand.

In a twenty-second embodiment, the present disclosure provides an absorbent article comprising the polymeric netting of any one of the first to twenty-first embodiments, a liquid impermeable backsheet, and an absorbent core, wherein the absorbent core is between the polymeric netting and the backsheet, wherein the polymeric netting is between the absorbent core and the backsheet, or wherein the polymeric netting is within the absorbent core.

In a twenty-third embodiment, the present disclosure provides the absorbent article of the twenty-second embodiment, wherein the polymeric netting is a topsheet.

In a twenty-fourth embodiment, the present disclosure provides the absorbent article of the twenty-second embodiment, wherein the polymeric netting is an acquisition layer between a topsheet and the absorbent core.

In a twenty-fifth embodiment, the present disclosure the present disclosure provides the polymeric netting of any one of the first to nineteenth embodiments joined to a carrier.

In a twenty-sixth embodiment, the present disclosure provides the polymeric netting of any one of the first to nineteenth embodiments for use as an elastic wrap.

In a twenty-seventh embodiment, the present disclosure provides an extrusion die comprising at least one cavity, a dispensing surface, and fluid passageways between the at least one cavity and the dispensing surface, wherein the dispensing surface has an array of first and third dispensing orifices interspersed with an array of discrete, substantially vertically aligned second dispensing orifices, wherein the first, second, and third dispensing orifices each have a top edge, a bottom edge, a height that is the distance between the top edge and the bottom edge, and a width, wherein the first and third dispensing orifices each independently have a height-to-width aspect ratio of at least three to one, and wherein the array of first dispensing orifices is vertically and horizontally offset from the array of third dispensing orifices.

In a twenty-eighth embodiment, the present disclosure provides the extrusion die of the twenty-seventh embodiment, wherein the height of at least one of the first and third dispensing orifices is larger than the height of the second dispensing orifices.

In a twenty-ninth embodiment, the present disclosure provides the extrusion die of the twenty-seventh or twenty-eighth embodiment, wherein the height of at least one of the first dispensing orifices or third dispensing orifices independently is at least two times larger than the height of the second dispensing orifices.

In a thirtieth embodiment, the present disclosure provides the extrusion die of any one of the twenty-seventh to twenty-ninth embodiments, wherein the first, second, and third dispensing orifices, and any other dispensing orifices, are arranged in a single row across the dispensing surface.

In a thirty-first embodiment, the present disclosure provides the extrusion die of any one of the twenty-seventh to thirtieth embodiments, wherein the second dispensing orifices are positioned closer to the top edges of the first dispensing orifices than the bottom edges of the first dispensing orifices, and wherein the second dispensing orifices are positioned closer to the bottom edges of the third dispensing orifices than the top edges of the third dispensing orifices.

In a thirty-second embodiment, the present disclosure provides the extrusion die of any one of the twenty-seventh to thirty-first embodiments, wherein the top edges of first dispensing orifices are substantially aligned with the top edges of the second dispensing orifices, and wherein the bottom edges of the third dispensing openings are substantially aligned with the bottom edges of the second dispensing orifices.

In a thirty-third embodiment, the present disclosure provides the extrusion die of any one of the twenty-seventh to thirty-second embodiments, wherein the fluid passageways are provided by a plurality of sequences of shims.

In thirty-fourth embodiment, the present disclosure provides the extrusion die of any one of the twenty-seventh to thirty-second embodiments, wherein the extrusion die comprises at least a first and second cavity, first fluid passageways between the first cavity and the first dispensing orifices, second fluid passageways between the second cavity and the second dispensing orifices, and third fluid passageways between the first cavity or a third cavity and the third dispensing orifices.

In a thirty-fifth embodiment, the present disclosure provides the extrusion die of the thirty-fourth embodiment, wherein the extrusion die comprises the third cavity, and wherein the third fluid passageways are between the third cavity and the third dispensing orifices.

In a thirty-sixth embodiment, the present disclosure provides the extrusion die of the thirty-fourth or thirty-fifth embodiment, wherein the fluid passageways are provided by a plurality of sequences of shims, wherein each sequence comprises at least one first shim that provides the first fluid passageway, at least one second shim that provides the second fluid passageway, and at least one third shim that provides the third fluid passageway.

In a thirty-seventh embodiment, the present disclosure provides the extrusion die of any one of the twenty-seventh to thirty-sixth embodiments, wherein at least the first dispensing orifices are defined by an array of first vestibules, a first fluid passageway between the first cavity and one of the first vestibules, a fourth passageway extending from the second, third, or a fourth cavity to the same vestibule, such that the area where the fourth fluid passageway enters the first vestibule is below the area where the first fluid passageway enters the first vestibule.

In a thirty-eighth embodiment, the present disclosure provides the extrusion die of the thirty-seventh embodiment, wherein the first and fourth fluid passageways are provided by a plurality of sequences of shims, wherein each sequence comprises at least one first shim that provides the first fluid passageway, and at least one third shim that provides the fourth fluid passageway.

In a thirty-ninth embodiment, the present disclosure provides the extrusion die of any one of the twenty-seventh to thirty-eighth embodiments, wherein the height-to-width aspect ratio of at least one of the first dispensing orifices or second dispensing orifices is independently at least 5 to 1.

In a fortieth embodiment, the present disclosure provide the extrusion die of any one of the twenty-seventh to thirty-ninth embodiments, wherein at least one of the first dispensing orifices or third dispensing orifices do not have a uniform height.

In forty-first embodiment, the present disclosure provides the extrusion die of any one of the twenty-seventh to fortieth embodiments, wherein one second dispensing orifice is disposed between any two adjacent first or third dispensing orifices, and wherein one first or third dispensing orifice is disposed between any two adjacent second dispensing orifices.

In a forty-second embodiment, the present disclosure provides the extrusion die of any one of the twenty-seventh to forty-first embodiment, wherein one first dispensing orifice is disposed between any two adjacent third dispensing orifices, and wherein one third dispensing orifice is disposed between any two adjacent first dispensing orifices.

In a forty-third embodiment, the present disclosure provides a method of making a polymeric netting, the method comprising:

providing the extrusion die of any one of the twenty-seventh to forty-second embodiments; and simultaneously dispensing first polymeric ribbons from the first dispensing orifices at a first speed, polymeric strands from the second dispensing orifices at a second speed, and second polymeric ribbons from the third dispensing orifices at a third speed to provide the polymeric netting, wherein the second speed is at least twice the first speed and at least twice the third speed.

In a forty-fourth embodiment, the present disclosure provides the method of the forty-third embodiment, wherein the polymeric netting is the polymeric netting of any one of the first to twenty-first embodiments.

In a forty-fifth embodiment, the present disclosure provides a method of making the polymeric netting of any one of the first to twenty-first embodiments, the method comprising:

providing an extrusion die comprising at least one cavity, a dispensing surface, and fluid passageways between the at least one cavity and the dispensing surface, wherein the dispensing surface has an array of first and third dispensing orifices interspersed with an array of discrete, substantially vertically aligned second dispensing orifices, wherein the first, second, and third dispensing orifices each have a top edge, a bottom edge, a height that is the distance between the top edge and the bottom edge, and a width, wherein the first and third dispensing orifices each independently have a height-to-width aspect ratio of at least three to one, and wherein the array of first dispensing orifices is vertically offset from the array of third dispensing orifices; and simultaneously dispensing first polymeric ribbons from the first dispensing orifices at a first speed, polymeric strands from the second dispensing orifices at a second speed, and second polymeric ribbons from the third dispensing orifices at a third speed to provide the polymeric netting, wherein the second speed is at least twice the first speed and at least twice the third speed.

In a forty-sixth embodiment, the present disclosure provides the method of the forty-fifth embodiment, wherein extrusion die is the extrusion die of any one of the twenty-seventh to forty-second embodiments.

In a forty-seventh embodiment, the present disclosure provides the method of any one of the forty-third to forty-sixth embodiments, wherein the at least one of the first or second polymeric ribbons are substantially straight.

In a forty-eighth embodiment, the present disclosure provides the method of any one of the forty-third to forty-seventh embodiments, wherein the polymeric strands oscillate to at least partially alternately bond to two adjacent first and second polymeric ribbons.

In order that this disclosure can be more fully understood, the following examples are set forth. It should be understood that these examples are for illustrative purposes only, and are not to be construed as limiting this disclosure in any manner. All parts and percentages are by weight unless otherwise indicated.

EXAMPLES

Example 1

A co-extrusion die as generally depicted in FIGS. 10 and 11 and assembled with a multi shim repeating pattern of extrusion orifices as generally illustrated in FIGS. 9A and 9B was prepared. The thickness of the shims in the repeat sequence was 4 mils (0.102 mm) for shims 100, 200, 300, and 400. These shims were formed from stainless steel, with perforations cut by a wire electron discharge machining. Referring to FIGS. 7 and 8, the heights of the dispensing openings 356 and 456 of shims 300 and 400 were both cut to 100 mils (2.54 mm). The height of the dispensing opening 156 of shims 100 were both cut to 30 mils (0.765 mm). The shims were stacked in a repeating sequence 400, 400, 200, 200, 100, 100, 200, 200, 300, 300, 200, 200, 100, 100, 200, 200. As assembled the widths of the dispensing openings 1003, 1011, and 1001 were each 0.203 mm, and the land spacings between openings were 0.203 mm. The extrusion orifices were aligned in a collinear, alternating arrangement, and resulting dispensing surface was as shown in FIGS. 9A and 9B. The total width of the shim setup was about 12.5 cm.

The inlet fittings on the two end blocks were each connected to three conventional single-screw extruders. Each extruder feeding cavities 1012a, 1012b and 1012c were loaded with styrene-ethylene/butylene-styrene block copolymer elastomer (obtained under the trade designation "MD6751" from Kraton, Belpre, Ohio) dry blended with 3% pink, yellow, and purple colorant masterbatch, respectively, (yellow colorant obtained under the trade designation "YELLOW 116" from Americhem, Cuyahoga Falls, Ohio, neon pink and purple obtained under the trade designation "PAN813C NEON PINK" and "PAN266C PURPLE" from Clariant, Minneapolis, Minn.).

The flow rate of the pink polymer exiting openings 1001 was 2.0 kg/hr, and the flow rate of the yellow polymer exiting openings 1003 was 3.08 kg/hr, and the flow rate of the purple polymer exiting openings 1001 was 1.36 kg/hr. The melt was extruded vertically into an extrusion quench takeaway. The quench takeaway speed was 1.67 m/min, and the melt drop distance was 4 cm. The extrusion temperature was 232° C. The polymer exiting openings 1003 was oscillating. The quench roll was a smooth, temperature-controlled chrome plated 20-cm diameter steel roll. The quench temperature, which was 10° C., was controlled with internal water flow. The web was further cooled on the quench roll with compressed air flow through four 2.5-inch (6.35 cm) Loc-Line® Swivel Nozzle 75 (Lockwood Products, INC, Lake Oswego, Oreg.). The web path wrapped 180 degrees around the chrome steel roll and then to a windup roll.

Photographs of the polymeric netting obtained are shown in FIGS. 18A and 18B. Using an optical microscope at 30× magnification, the polymeric strand width and height were determined to be 306 micrometers and 747 micrometers, respectively, the pink polymeric ribbon width and height were determined to be 204 micrometers and 1736 micrometers, respectively, and the purple polymeric ribbon width and height were determined to be 200 micrometers and 1782 micrometers, respectively. The basis weight of the polymeric netting was measured by weighing three 2 inch by 10 inch (5.1 cm by 25.4 cm) pieces of the netting with an analytical balance and averaging the values. The basis weight of the polymeric netting was found to be 680 g/m$^2$, and its overall caliper was 3.03 mm.

Example 2

The top sheet was removed from a 270 mm by 90 mm pad obtained from First Quality Retail Services, Macon, Ga., under the trade designation "OPTIONS ULTRA THINS", and the top sheet was replaced with a piece of the polymeric netting prepared in Example 1. The piece of the polymeric netting had dimensions of approximately 260 mm by 90 mm. The polymeric netting was placed on top of the acquisition/distribution layer without adhesive.

Example 3

A piece of the polymeric netting made as described in Example 1 (approximately 260 mm by 90 mm) was soaked in a solution made from 90 grams of water and 10 grams of surfactant obtained from Dow Chemical Company under the trade designation "TRITON X-100. After completely submerging the polymeric netting, it was immediately removed from the solution, and the excess liquid was allowed to drip off. The sample was placed on an aluminum tray and dried for two hours at 50° C. in a batch oven. The top sheet was removed from a 270 mm by 90 mm pad obtained from First Quality Retail Services under the trade designation "OPTIONS ULTRA THINS", and the top sheet was replaced with the soaked and dried polymeric netting. The polymeric netting was placed on top of the acquisition/distribution layer without adhesive.

Example 4

The top sheet was removed from a 270 mm by 90 mm pad obtained from First Quality Retail Services under the trade designation "OPTIONS ULTRA THINS", and the acquisition/distribution was removed and replaced with a piece of the polymeric netting made as described in Example 1. The piece of the polymeric netting had dimensions of approximately 165 mm by 50 mm. The polymeric netting was placed on top of the absorbent without adhesive, and the original topsheet was positioned on top of the polymeric netting without adhesive.

Comparative Example A

Comparative Example A was an unmodified 270 mm by 90 mm pad obtained from First Quality Retail Services under the trade designation "OPTIONS ULTRA THINS".

Comparative Example B

Comparative Example B was a 270 mm by 90 mm pad obtained from First Quality Retail Services under the trade designation "OPTIONS ULTRA THINS" in which the topsheet had been removed and replaced.

Test Methods

Figure 19:
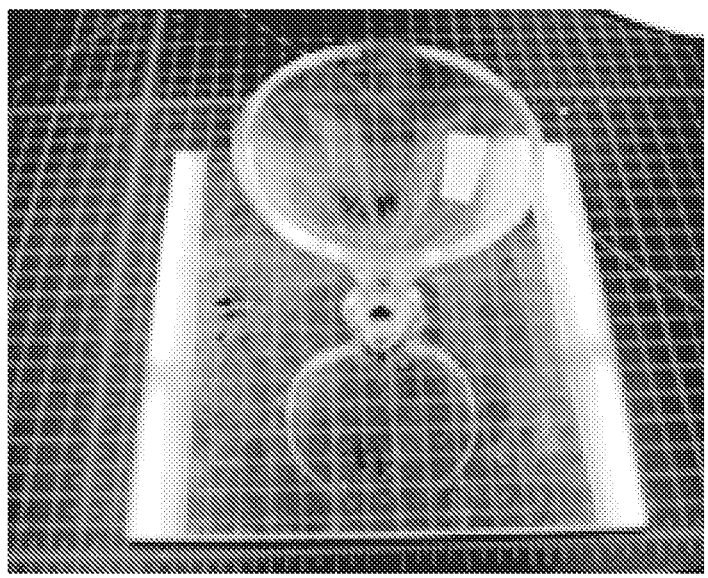
FIG. 19 is a photograph of a test jig used to evaluate the fluid strike-through time for Examples 1, 2, and 3.

Strike-Through Time:

The strike through time was measured using a test jig shown in FIG. 19. The jig was made of a poly(methyl methacrylate) sheet and had a dimension of 203 mm by 203 mm by 5 mm. A glass funnel with 15-mm diameter circular opening at the bottom was fit into a complimentary opening in the poly(methyl methacrylate) sheet, and the funnel was sealed into the opening with wax. Comparative Examples A and B and Examples 2 to 4 were each individually placed between the test jig and a poly(methyl methacrylate) sheet having a dimension of 203 mm by 203 mm by 5 mm having no opening. The opening in the test jig was placed approximately over the center of the pad. Four 250-gram weights were placed on top of the poly(methyl methacrylate) sheet, one in each of the four corners, which provided a 572 Pa (0.083 psi) force onto the pad. The bottom of the funnel was in contact with the pad. A volume of 20 mL of 0.9% NaCl aqueous solution including a small amount of red dye obtained from Aldrich Chemical Company, Milwaukee, Wis., under the trade designation "DIRECT RED 81" was poured through the funnel. The strike-through time was measured with a stopwatch in seconds from the time the solution was poured into the funnel and the time the funnel was totally empty. One sample was tested for each Example and Comparative Example.

Rewet:

The test jig was removed from the pad at the end of the Strike-through Time evaluation, and the pad was allowed to stand for five minutes after the solution was applied. Ten pieces of pre-weighed VWR filter paper #110 (11 cm circle) were then applied on the top of the pad in the center in a stack, and a 152 mm by 78 mm weight (1967.2 grams) was placed on top of the filter paper for three minutes. The weight was removed, and the pieces of filter paper were reweighed. The rewet in grams was recorded as the weight gain on the pieces of filter paper.

Fluid Distribution:

After the weight was removed from the sample in the Rewet evaluation, the distance that the solution traveled along the pad lengthwise and widthwise was measured using a ruler.

The Strike-Through Time, Rewet, and Fluid Distribution length and width for each of Comparative Examples A and B and Examples 2 to 4 are reported in Table 1, below.

TABLE 1

| Example | Strike-Through Time (seconds) | Rewet (grams) | Fluid Distribution Length (mm) | Fluid Distribution Width (mm) |
|---|---|---|---|---|
| Comp. Ex. A | 7.8 | 0.046 | 115 | 65 |
| Comp. Ex. B | 5.3 | 0.702 | 100 | 70 |
| Example 2 | 2.3 | 1.655$^a$ | 150 | 65 |
| Example 3 | 1.6 | 0.163 | 180 | 50 |
| Example 4 | 2.4 | 0.708$^b$ | 190 | 50 |

$^a$The liquid did not go through the netting; therefore the rewet value is higher.
$^b$It is believed that the disruption of the pad created air gaps and SAP contamination on the topsheet to cause higher rewet values.

Foreseeable modifications and alterations of this disclosure will be apparent to those skilled in the art without departing from the scope and spirit of this invention. This invention should not be restricted to the embodiments that are set forth in this application for illustrative purposes.

What is claimed is:

1. A polymeric netting comprising first and second polymeric ribbons and polymeric strands, each of the first and second polymeric ribbons and polymeric strands having a length and width, wherein the length is the longest dimension and the width is the shortest dimension, wherein the first and second polymeric ribbons each independently have a height-to-width aspect ratio of at least three to one, a major surface that is intermittently bonded to a polymeric strand, with a center line bisecting the major surface and first and second edges symmetrically disposed on opposite sides of the center line, wherein the polymeric netting has first and second opposing major surfaces transverse to the major surfaces of the first and second polymeric ribbons, wherein the first major surface of the polymeric netting comprises the first edges of the first polymeric ribbons, wherein the second major surface comprises the second edges of the second polymeric ribbons, wherein the first polymeric ribbons do not extend to the second major surface of the polymeric netting, and wherein the second polymeric ribbons do not extend to the first major surface of the polymeric netting.

2. The polymeric netting of claim 1, wherein the height of at least one of the first and second polymeric ribbons is greater than the height of the polymeric strands for at least a portion of the polymeric netting.

3. The polymeric netting of claim 1, wherein neither the first nor second major surface of the polymeric netting comprises a portion of the polymeric strands.

4. The polymeric netting of claim 1, wherein the major surface of the first polymeric ribbons is bonded to its polymeric strand at a location closer to the second edge than the first edge, and the major surface of the second polymeric ribbons is bonded to its polymeric strand at a location closer to the first edge than the second edge.

5. The polymeric netting of claim 1, wherein for at least one of the first or second polymeric ribbons the first edges comprise a different polymeric composition than the second edges in at least a portion of the polymeric netting.

6. The polymeric netting of claim 1, wherein polymeric strands alternate with at least one of the first or second polymeric ribbons in at least a portion of the polymeric netting.

7. The polymeric netting of claim 1, wherein the height-to-width aspect ratio of at least one of the first polymeric ribbons or second polymeric ribbons is independently at least 5 to 1.

8. The polymeric netting of claim 1, wherein at least one of the following conditions is met:
wherein at least some of the first and second polymeric ribbons have a different color than at least some of the polymeric strands; or
wherein at least some of the first polymeric ribbons have a different color than at least some of the second polymeric ribbons.

9. The polymeric netting of claim 1, wherein the first polymeric ribbons are elastic, the second polymeric ribbons are elastic, the polymeric strands are elastic, or any combination thereof.

10. An absorbent article comprising a polymeric netting of claim 1, a liquid impermeable backsheet, and an absorbent core, wherein the absorbent core is between the polymeric netting and the backsheet, wherein the polymeric netting is between the absorbent core and the backsheet, or wherein the polymeric netting is within the absorbent core.

11. A method of making the polymeric netting of claim 1, the method comprising:
providing an extrusion die comprising at least one cavity, a dispensing surface, and fluid passageways between the at least one cavity and the dispensing surface, wherein the dispensing surface has an array of first and third dispensing orifices interspersed with an array of discrete, substantially vertically aligned second dispensing orifices, wherein the first, second, and third dispensing orifices each have a height and a width, wherein the first and third dispensing orifices each independently have a height-to-width aspect ratio of at least three to one, and wherein the array of first dispensing orifices is vertically and horizontally offset from the array of third dispensing orifices; and
simultaneously dispensing first polymeric ribbons from the first dispensing orifices at a first speed, polymeric strands from the second dispensing orifices at a second speed, and second polymeric ribbons from the third dispensing orifices at a third speed to provide the polymeric netting, wherein the second speed is at least twice the first speed and at least twice the third speed.

12. The method of claim 11, wherein at least one of the first polymeric ribbons or the second polymeric ribbons are substantially straight.

13. The method of claim 11, wherein the height of at least one of the first and third dispensing orifices is larger than the height of the second dispensing orifices.

14. The method of claim 11, wherein the extrusion die comprises at least a first and second cavity, first fluid passageways between the first cavity and the first dispensing orifices, second fluid passageways between the second cavity and the second dispensing orifices, and third fluid passageways between the first cavity, the second cavity, or a third cavity and the third dispensing orifices.

15. The method of claim 11, wherein the polymeric strands oscillate to at least partially alternately bond to two adjacent first and second polymeric ribbons.

16. The polymeric netting of claim 1, wherein at least one of the first or second polymeric ribbons are substantially straight.

17. The polymeric netting of claim 1, wherein at least one of the first or second polymeric ribbons do not have a uniform height.

18. The polymeric netting of claim 1, wherein in at least a portion of the polymeric netting, the major surface of at least one of the first or second polymeric ribbons is bonded to more than one polymeric strand.

19. The polymeric netting of claim 1, wherein in at least a portion of the polymeric netting, the major surface of at least one of the first or second polymeric ribbons is bonded to only one polymeric strand.

* * * * *